(12) United States Patent
Bai et al.

(10) Patent No.: US 12,549,242 B2
(45) Date of Patent: Feb. 10, 2026

(54) IDENTIFICATION OF A BEAM FAILURE DETECTION REFERENCE SIGNAL AND A NEW BEAM IDENTIFICATION REFERENCE SIGNAL

(71) Applicant: QUALCOMM Incorporated, San Diego, CA (US)

(72) Inventors: Tianyang Bai, Somerville, NJ (US); Yan Zhou, San Diego, CA (US); Tao Luo, San Diego, CA (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/444,249

(22) Filed: Aug. 2, 2021

(65) Prior Publication Data

US 2023/0032365 A1 Feb. 2, 2023

(51) Int. Cl.
*H04B 7/08* (2006.01)
*H04B 7/06* (2006.01)
*H04L 5/00* (2006.01)
*H04W 24/08* (2009.01)
*H04W 76/19* (2018.01)

(52) U.S. Cl.
CPC ......... *H04B 7/06964* (2023.05); *H04B 7/088* (2013.01); *H04L 5/0051* (2013.01); *H04W 24/08* (2013.01); *H04W 76/19* (2018.02)

(58) Field of Classification Search
CPC ..... H04B 7/088; H04B 7/0695; H04L 5/0051; H04W 24/08; H04W 76/19
See application file for complete search history.

(56) References Cited

U.S. PATENT DOCUMENTS

| 2019/0253308 | A1* | 8/2019 | Huang | H04L 43/0823 |
| 2019/0306924 | A1* | 10/2019 | Zhang | H04B 7/063 |
| 2020/0413469 | A1* | 12/2020 | Wu | H04W 36/305 |
| 2021/0050968 | A1* | 2/2021 | Yi | H04L 5/0048 |
| 2021/0058999 | A1* | 2/2021 | Chen | H04W 76/19 |
| 2021/0168779 | A1* | 6/2021 | Mondal | H04L 5/0035 |
| 2021/0314053 | A1* | 10/2021 | Matsumura | H04L 5/001 |

(Continued)

FOREIGN PATENT DOCUMENTS

| EP | 4064583 A1 | 9/2022 |
| WO | 2021107575 A1 | 6/2021 |

OTHER PUBLICATIONS

Apple Inc: "Remaining Issues on Multi-Beam Operation", R1-1912824, 3GPP TSG RAN WG1 #99, 3rd Generation Partnership Project, Mobile Competence Centre, 650, Route Des Lucioles, F-06921 Sophia-Antipolis Cedex, France, vol. RAN WG1, No. Reno, USA, Nov. 18, 2019-Nov. 22, 2019, Nov. 9, 2019, 14 Pages, XP051823624, p. 4, chapter 3.1.

(Continued)

*Primary Examiner* — Raj Jain
(74) *Attorney, Agent, or Firm* — QUALCOMM Incorporated

(57) ABSTRACT

Various aspects of the present disclosure generally relate to wireless communication. In some aspects, a user equipment (UE) may receive a set of beam failure detection reference signals associated with a transmit receive point (TRP). The UE may receive a set of new beam identification reference signals associated with the TRP. Numerous other aspects are described.

30 Claims, 12 Drawing Sheets

(56) References Cited

U.S. PATENT DOCUMENTS

| | | | | |
|---|---|---|---|---|
| 2021/0315041 | A1* | 10/2021 | Matsumura | H04W 72/21 |
| 2021/0320764 | A1* | 10/2021 | Gao | H04L 5/0032 |
| 2022/0109489 | A1* | 4/2022 | Zhu | H04B 7/088 |
| 2022/0109547 | A1* | 4/2022 | Svedman | H04L 5/0098 |
| 2022/0117024 | A1* | 4/2022 | Saber | H04B 7/0695 |
| 2022/0132517 | A1* | 4/2022 | Zhu | H04L 5/0051 |
| 2022/0322310 | A1 | 10/2022 | Laddu et al. | |
| 2023/0007699 | A1* | 1/2023 | Wei | H04W 76/11 |
| 2023/0032365 | A1* | 2/2023 | Bai | H04W 24/08 |
| 2023/0053871 | A1* | 2/2023 | Tran | H04B 7/0408 |
| 2023/0164865 | A1* | 5/2023 | Kang | H04B 7/0408 370/329 |
| 2023/0216565 | A1* | 7/2023 | Kwak | H04B 7/0695 375/267 |
| 2023/0309174 | A1* | 9/2023 | Bi | H04B 7/06964 |
| 2024/0073710 | A1* | 2/2024 | Li | H04B 7/06964 |
| 2024/0121641 | A1* | 4/2024 | Matsumura | H04W 72/04 |

OTHER PUBLICATIONS

Asia Pacific Telecom et al., "Discussion of Enhancements on Beam Management for Multi-TRP", 3GPP TSG RAN WG1 #105-e, R1-2105818, 3rd Generation Partnership Project, Mobile Competence Centre, 650, Route Des Lucioles, F-06921 Sophia-Antipolis Cedex, France, vol. RAN WG1, No. e-Meeting, May 10, 2021-May 27, 2021, May 12, 2021, XP052011735, 6 Pages, chapter 2.1.
International Search Report and Written Opinion—PCT/US2022/074180—ISA/EPO—Dec. 19, 2022.
Partial International Search Report—PCT/US2022/074180—ISA/EPO—Oct. 28, 2022.
Moderator (CATT): "Moderator Summary on M-TRP Simultaneous Transmission with Multiple Rx Panels (Round 1) ", 3GPP TSG RAN WG1 Meeting #104-e, R1-2101973, E-meeting, Jan. 25-Feb. 5, 2021, 20 pages.

* cited by examiner

IDENTIFICATION OF A BEAM FAILURE DETECTION REFERENCE SIGNAL AND A NEW BEAM IDENTIFICATION REFERENCE SIGNAL

FIELD OF THE DISCLOSURE

Aspects of the present disclosure generally relate to wireless communication and to techniques and apparatuses for identification of a beam failure detection reference signal and a new beam identification reference signal.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by an apparatus of a user equipment (UE). The method may include receiving a set of beam failure detection reference signals (BFD-RSs) associated with a transmit receive point (TRP). The method may include receiving a set of new beam identification reference signals (NBI-RSs) associated with the TRP.

Some aspects described herein relate to a method of wireless communication performed by an apparatus of a base station. The method may include transmitting, to a UE, a set of BFD-RSs associated with a TRP. The method may include transmitting, to the UE, a set of NBI-RSs associated with the TRP.

Some aspects described herein relate to an apparatus for wireless communication at a UE. The apparatus may include a memory and one or more processors coupled to the memory. The one or more processors may be configured to receive a set of BFD-RSs associated with a TRP. The one or more processors may be configured to receive a set of NBI-RSs associated with the TRP.

Some aspects described herein relate to an apparatus for wireless communication at a base station. The apparatus may include a memory and one or more processors coupled to the memory. The one or more processors may be configured to transmit, to a UE, a set of BFD-RSs associated with a TRP. The one or more processors may be configured to transmit, to the UE, a set of NBI-RSs associated with the TRP.

Some aspects described herein relate to a non-transitory computer-readable medium that stores a set of instructions for wireless communication by a UE. The set of instructions, when executed by one or more processors of the UE, may cause the UE to receive a set of BFD-RSs associated with a TRP. The set of instructions, when executed by one or more processors of the UE, may cause the UE to receive a set of NBI-RSs associated with the TRP.

Some aspects described herein relate to a non-transitory computer-readable medium that stores a set of instructions for wireless communication by a base station. The set of instructions, when executed by one or more processors of the base station, may cause the base station to transmit, to a UE, a set of BFD-RSs associated with a TRP. The set of instructions, when executed by one or more processors of the base station, may cause the base station to transmit, to the UE, a set of NBI-RSs associated with the TRP.

Some aspects described herein relate to an apparatus for wireless communication. The apparatus may include means for receiving a set of BFD-RSs associated with a TRP. The apparatus may include means for receiving a set of NBI-RSs associated with the TRP.

Some aspects described herein relate to an apparatus for wireless communication. The apparatus may include means for transmitting, to a UE, a set of BFD-RSs associated with a TRP. The apparatus may include means for transmitting, to the UE, a set of NBI-RSs associated with the TRP.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
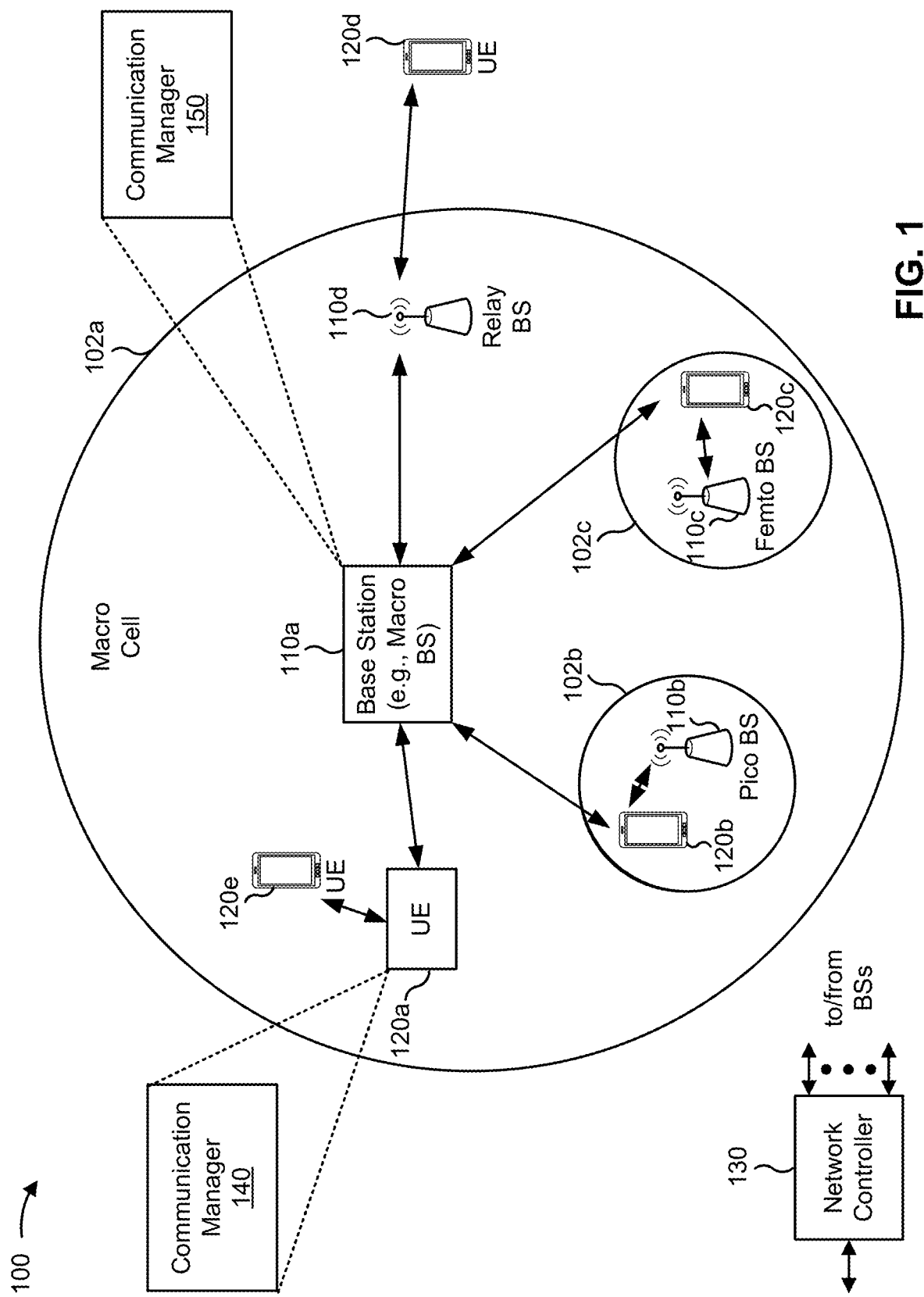
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110*a*, a BS 110*b*, a BS 110*c*, and a BS 110*d*), a user equipment (UE) 120 or multiple UEs 120 (shown as a UE 120*a*, a UE 120*b*, a UE 120*c*, a UE 120*d*, and a UE 120*e*), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110*a* may be a macro base station for a macro cell 102*a*, the BS 110*b* may be a pico base station for a pico cell 102*b*, and the BS 110*c* may be a femto base station for a femto cell 102*c*. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110*d* (e.g., a relay base station) may communicate with the BS 110*a* (e.g., a macro base station) and the UE 120*d* in order to facilitate communication between the BS 110*a* and the UE 120*d*. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may receive a set of beam failure detection reference signals (BFD-RSs) associated with a TRP; and receive a set of new beam identification reference signals (NBI-RSs) associated with the TRP. Additionally, or alternatively, the communication manager 140 may perform one or more other operations described herein.

In some aspects, the base station 110 may include a communication manager 150. As described in more detail elsewhere herein, the communication manager 150 may transmit, to a UE, a set of BFD-RSs associated with a TRP; and transmit, to the UE, a set of NBI-RSs associated with the TRP. Additionally, or alternatively, the communication manager 150 may perform one or more other operations described herein.

As indicated above, FIG. 1 is provided as an example. Other examples may differ from what is described with regard to FIG. 1.

Figure 2:
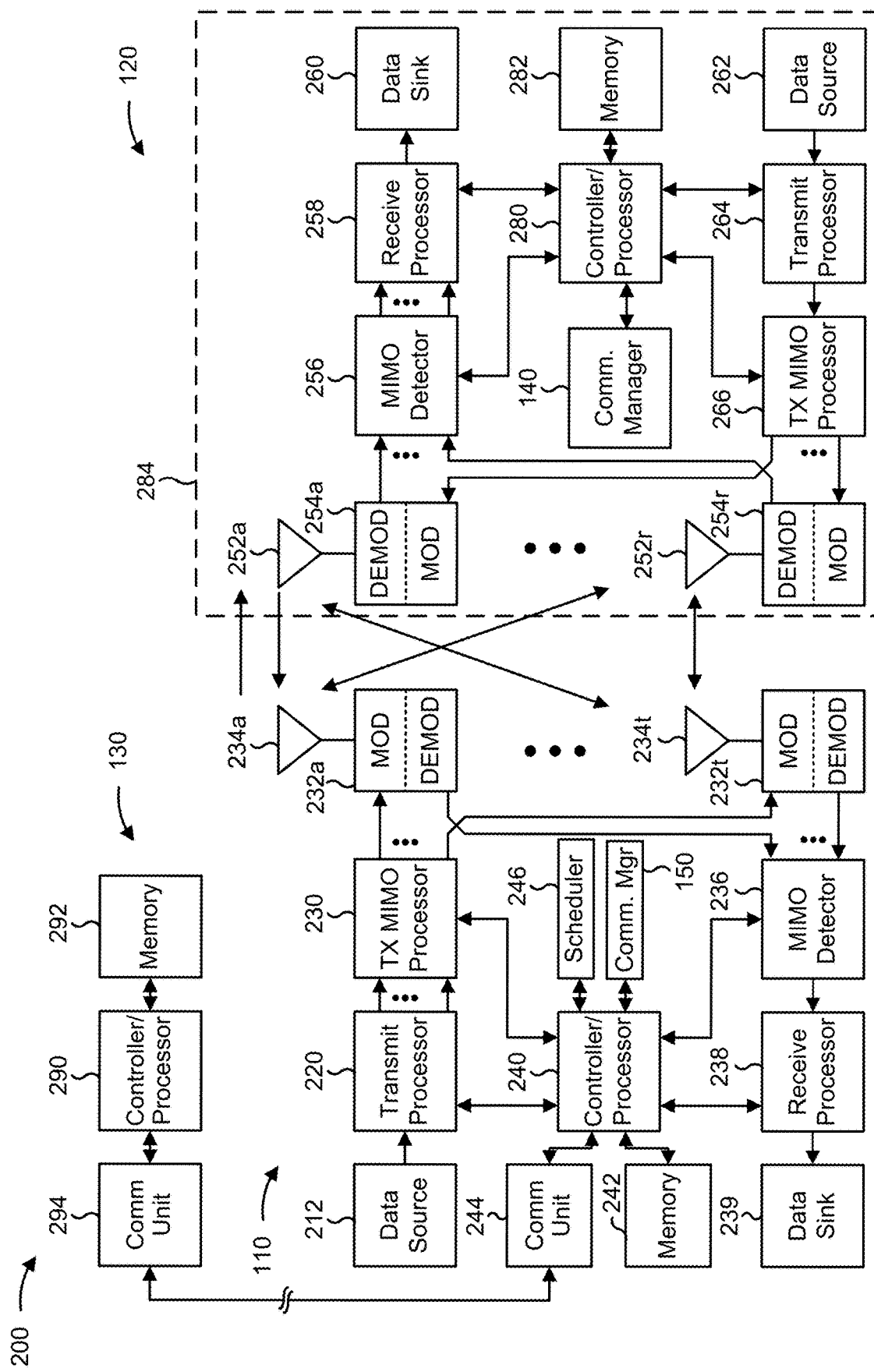
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 8-12).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 8-12).

The controller/processor 240 of the base station 110, the controller/processor 280 of the UE 120, and/or any other component(s) of FIG. 2 may perform one or more techniques associated with identification of a BFD-RS and an NBI-RS, as described in more detail elsewhere herein. In some aspects, a TRP described herein is the base station 110, is included in the base station 110, or includes one or more components of the base station 110 shown in FIG. 2. The controller/processor 240 of the base station 110, the controller/processor 280 of the UE 120, and/or any other component(s) of FIG. 2 may perform or direct operations of, for example, process 900 of FIG. 9, process 1000 of FIG. 10, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 900 of FIG. 9, process 1000 of FIG. 10, and/or other processes as described herein. In some examples, executing instructions may include running the instructions, converting the instructions, compiling the instructions, and/or interpreting the instructions, among other examples.

In some aspects, the UE includes means for receiving a set of BFD-RSs associated with a TRP; and/or means for receiving a set of NBI-RSs associated with the TRP. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the base station includes means for transmitting, to a UE, a set of BFD-RSs associated with a TRP; and/or means for transmitting, to the UE, a set of NBI-RSs associated with the TRP. The means for the base station to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
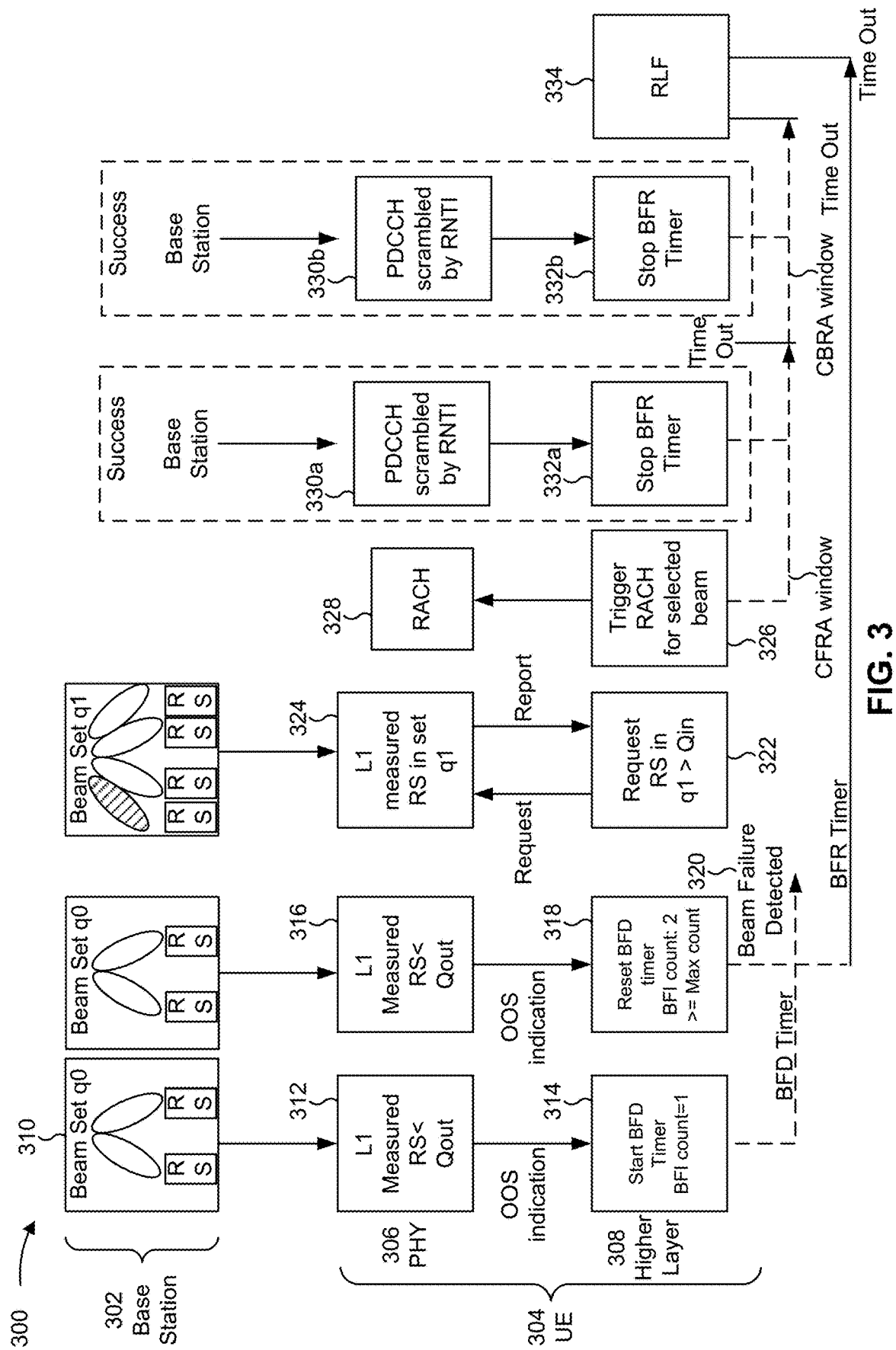
FIGS. 3-5 are diagrams illustrating examples of beam failure detection and beam failure recovery, in accordance with the present disclosure.

FIG. 3 is a diagram illustrating an example 300 of beam failure detection and beam failure recovery, in accordance with the present disclosure. The beam failure detection (BFD) procedure is shown by reference numbers 312 through 320, and the beam failure recovery (BFR) procedure is shown by reference number 322 through 334.

Example 300 includes operations performed by a base station and a UE. Operations performed by the base station are shown in the top part of FIG. 3 by reference number 302, and operations performed by the UE are shown in the bottom part of FIG. 3 by reference number 304. Actions of the UE that are performed by a physical (PHY) layer of the UE are shown in the row indicated by reference number 306, and actions of the UE that are performed by a higher layer (e.g., medium access control (MAC), radio link control (RLC), packet data convergence protocol (PDCP), radio resource control (RRC), non access stratum (NAS), Internet Protocol (IP), or the like) are shown in the row indicated by reference number 308.

As shown by reference number 310, the base station may transmit a beam set q0. The beam set q0 may include one or more beams that are each associated with a corresponding reference signal. Thus, the set of reference signals for the beam set q0 may be referred to as a set of BFD-RSs. The reference signal may include a synchronization signal block (SSB), a channel state information reference signal (CSI-RS), or the like.

As shown by reference number 312, the UE may perform a Layer 1 (L1) measurement of the reference signals of the beam set q0. For example, the UE may determine a measurement regarding each reference signal of the beam set q0. The measurement may include an RSRP, RSRQ, a signal to interference and noise ratio (SINR), or the like. As further shown, the UE (e.g., the PHY layer) may determine that the L1 measurement (e.g., the radio link quality) fails to satisfy a first threshold, referred to as Qout. As shown, the UE (e.g., the PHY layer) may provide an out of service (OOS) indication to a higher layer of the UE.

As shown by reference number 314, the UE (e.g., the higher layer) may start a BFD timer based at least in part on the failure of the beams to satisfy Qout and may increment a beam failure indication (BFI) count. If the BFI count satisfies a threshold (shown as "max count" in connection with reference number 318) before the expiration of the BFD timer, then the UE may determine beam failure. If the BFD timer expires before the BFI count satisfies the threshold, then the UE may reset the BFI count, thereby not determining a beam failure.

As shown by reference number 316, the UE (e.g., the PHY layer) may perform a second L1 measurement of the reference signals of the beam set q0. As further shown, the UE may provide an OOS indication to the higher layer of the UE indicating that the second L1 measurement fails to satisfy Qout. If the second L1 measurement had satisfied Qout, then the BFD timer may expire, and the UE 120 may not identify beam failure.

As shown by reference number 318, the UE may reset the BFD timer based at least in part on the second L1 measurement failing to satisfy the threshold and may increment the BFI count. As further shown, the BFI count now satisfies the maximum count threshold. Accordingly, as shown by reference number 320, the UE determines that beam failure is detected.

As shown by reference number 322, the UE (e.g., the higher layer) may request measurement of reference signals on a beam set q1 to identify one or more beams of the beam set q1 that satisfy a second threshold (e.g., Qin, which may be referred to as a BFR threshold). For example, the beam set q1 may be a set of candidate beams, or new beams, for the BFR procedure. Thus, the set of reference signals for the beam set q1 may be referred to as a set of NBI-RSs.

As shown by reference number 324, the UE (e.g., the PHY layer) may provide (e.g., upon a request from the higher layer) measurement information identifying L1 measurements of reference signals of the beam set q1. In example 300, the measurement information indicates that a particular reference signal associated with a particular beam satisfies Qin. For example, the UE may provide a reference signal index and an L1 measurement (e.g., RSRP) for each of the reference signals associated with an L1 measurement that satisfies the threshold Qin. In FIG. 3, a particular beam is illustrated by diagonal hatching. If the measurement information indicates that the particular reference signal associated with the particular beam satisfies Qin, then the UE may select the particular beam as a selected beam and may attempt to access the selected beam or a cell associated with the selected beam. For example, as shown by reference number 326, the UE (e.g., the higher layer) may trigger (e.g., initiate) a random access channel (RACH) procedure to access the selected beam, and, as shown by reference number 328, the UE (e.g., the PHY layer) may perform the RACH procedure. For example, the UE may provide a RACH Message 1 (e.g., a first message of a RACH procedure) to the base station to access the selected beam.

In an example, the UE may initiate random access procedures, beginning with contention-free random access (CFRA), using a random access resource (e.g., a random access preamble index) associated with the particular reference signal (e.g., that satisfies Qin). In the case where the RACH procedure (e.g., CFRA) is successful, the base station 110 may provide a physical downlink control channel (PDCCH) on the selected beam, as shown by reference number 330a. In some examples, this response may be a response to the RACH Message 1, such as a RACH Message 2, a random access response (RAR), or the like. As further shown, a cyclic redundancy check (CRC) of downlink control information (DCI) of the PDCCH may be scrambled using a radio network temporary identifier (RNTI) (e.g., a cell RNTI (C-RNTI), an MCS cell RNTI (MCS-C-RNTI), or another type of RNTI).

If the UE receives the PDCCH within the CFRA response window, BFR is successful. As shown by reference number 332a, the UE may stop the BFR timer based at least in part on the BFR being successful. If CFRA is not successful in the CFRA response window, the UE may perform contention-based random access (CBRA). The UE may perform CBRA using the same selected beam, or a different selected beam, used for performing CFRA. In the case where the RACH procedure (e.g., CBRA) is successful, the base station 110 may provide a PDCCH on the selected beam, as shown by reference number 330b, in a similar manner as described above. If the UE receives the PDCCH within the CBRA response window, BFR is successful. As shown by reference number 332b, the UE may stop the BFR timer based at least in part on the BFR being successful.

In the case wherein the RACH procedure is unsuccessful (e.g., upon expiration of the CFRA response window and/or the CBRA response window), the UE 120 may determine radio link failure (RLF) after expiration of the BFR timer, as shown by reference number 334. In such a case, the UE 120 may enter an idle mode, may report the RLF, may search for a new cell, or the like.

As indicated above, FIG. 3 is provided as an example. Other examples may differ from what is described with respect to FIG. 3.

Figure 4:
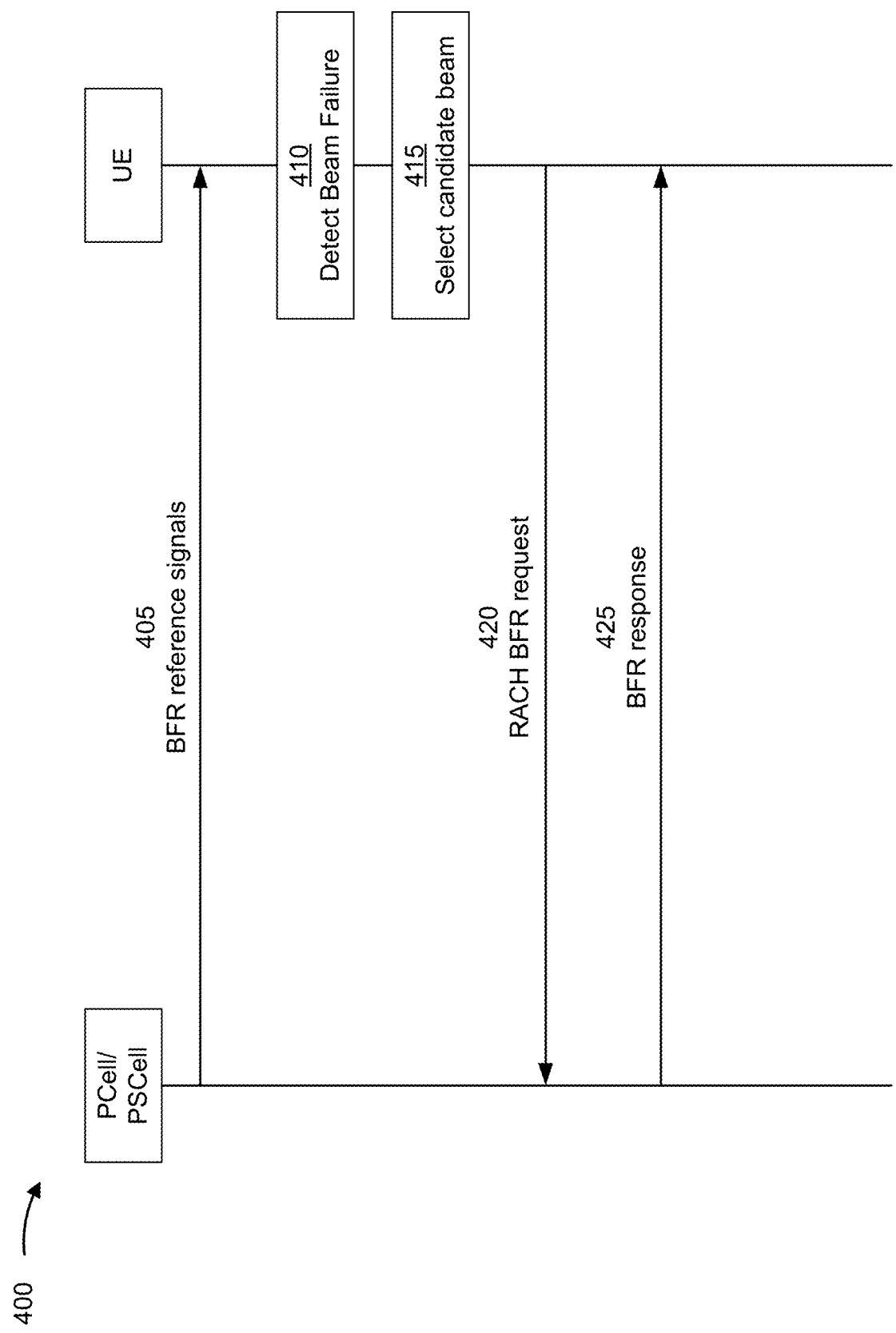

FIG. 4 is a diagram illustrating an example 400 of beam failure detection and beam failure recovery, in accordance with the present disclosure. In particular, example 400 shows BFD and BFR for a primary component carrier, or primary cell (PCell), configured for a UE. Carrier aggregation is a technology that enables two or more component carriers (sometimes referred to as carriers) to be combined (e.g., into a single channel) for a UE to enhance data capacity. In carrier aggregation, a UE may be configured with a primary carrier or PCell and one or more secondary carriers or secondary cells (SCells). In some aspects, the PCell may carry control information for scheduling data communications on the one or more SCells. The BFD and BFR shown in FIG. 4 may be used for the PCell in a case in which carrier aggregation is configured for the UE. The BFD and BFR shown in FIG. 4 may also be used for a primary secondary cell (PSCell) (e.g., a PCell of a secondary cell group) in a case in which dual connectivity and carrier aggregation are configured for the UE.

As shown in FIG. 4, and by reference number 405, a UE may receive (e.g., on the PCell or PSCell) a set of BFD-RSs transmitted by a base station. The UE may perform BFD based at least in part on measurements performed on the set of BFD-RSs, in a similar manner as described above. The set of BFD-RSs may include CSI-RSs transmitted using periodic CSI-RS resources configured via a parameter (e.g., failureDetectionResources) in an RRC message. In some examples, a set of BFD-RSs may be configured with up to two reference signals associated with a single antenna port. In a case in which the BFD-RS set is not configured by the base station, reference signal sets indicated by active transmission configuration indicator (TCI) states of control resource sets (CORESETs) monitored by the UE may be used for BFD. In some examples, in a case in which an active TCI state of a CORESET indicates two reference signal indices, the reference signal indicated for a quasi-co-location (QCL) Type D (e.g., which may define a spatial filter for a beam) may be used for BFD.

As shown by reference number 410, the UE may detect a beam failure based at least in part on the set of BFD-RSs, in a similar manner as described above. For example, the physical layer of the UE may assess radio link quality by performing measurements (e.g., RSRP measurements) of the BFD reference signals and comparing the measurements with a threshold (Qout). If the measurements are less than Qout, the physical layer may provide a beam failure indication (e.g., an OOS indication) to a higher layer of the UE, and the UE may detect beam failure based at least in part on a threshold number of beam failure indications within a certain time duration (e.g., a BFD timer), in a similar manner as described above.

As shown by reference number 415, based at least in part on detecting a beam failure, the UE may perform candidate beam detection (also referred to as "new beam identification" (NBI)) to select a candidate beam for BFR. The UE may perform candidate beam detection using a set of NBI-RSs. That is, the UE may perform candidate beam detection based at least in part on periodic CSI-RSs and/or SSBs configured (e.g., by the RRC parameter candidateBeamRSList). In some examples, CSI-RS/SSB resources may be configured for up to 16 beam candidates with corresponding random access preamble indices. Upon a request from a higher layer (e.g., the MAC layer), the physical layer of the UE may detect a reference signal with an RSRP that satisfies a threshold (Qin) and provide the reference signal index to the higher layers, in a similar manner as described above.

As shown by reference number 420, the UE may then transmit a RACH BFR request to the base station. For example, the UE may initiate a contention free RACH procedure based on the random access resource (e.g., the random access preamble index) associated with the selected reference signal index corresponding to the selected candidate beam.

As shown by reference number 425, the UE may receive a BFR response based at least in part on transmitting the RACH BFR request. The UE may monitor a PDCCH search space set to detect a PDCCH communication with DCI format with a CRC scrambled by a C-RNTI or an MCS-C-RNTI, starting a particular number of slots after transmitting the RACH request (e.g., starting from slot n+4). In this case, the UE monitors for a random access response (e.g., the PDCCH communication), which is the BFR response. The search space set for the PDCCH monitoring may be identified by a recovery search space identifier (e.g., recoverySearchSpaceId). In some examples, a CORESET associated with the search space set may not be used for any other search space set.

For PDCCH monitoring in the search space set, and for reception of a physical downlink shared channel (PDSCH) scheduled by the PDCCH, the UE may use the same QCL parameters as those associated with the reference signal index selected during candidate beam selection (e.g., the QCL parameters associated with the selected candidate beam). Thereafter, the UE 120 (e.g., the higher layer) may receive an activation of a TCI state or of the parameters TCI-StatesPDCCH-ToAddlist and/or TCI-StatesPDCCH-ToReleaseList. Moreover, after a threshold quantity of symbols (e.g., 28 symbols) following a last symbol of a first PDCCH reception (e.g., detection of DCI with a CRC scrambled using a C-RNTI or MCS-C-RNTI) in the search space set, the UE 120 may use the same QCL parameters as those associated with the reference signal index selected during candidate beam selection for PDCCH monitoring in a CORESET associated with an index 0.

In a case in which the UE does not receive the PDCCH communication within a response time window (e.g., associated with CFRA and/or CBRA) and/or prior to expiration of a BFR timer, the UE may declare RLF, in a similar manner as described above.

As indicated above, FIG. 4 is provided as an example. Other examples may differ from what is described with respect to FIG. 4.

Figure 5:
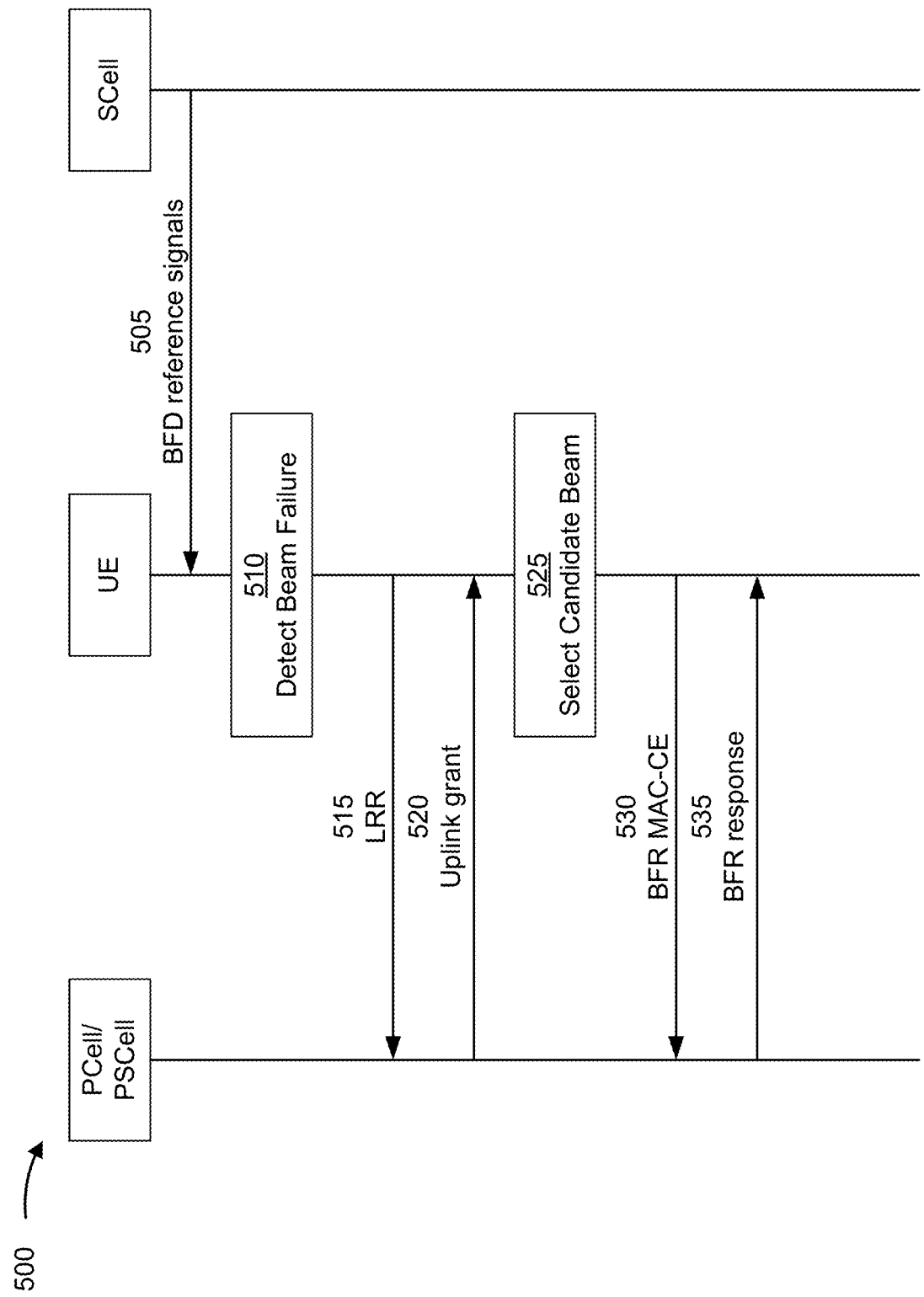

FIG. 5 is a diagram illustrating an example 500 of beam failure detection and beam failure recovery, in accordance with the present disclosure. In particular, example 500 shows BFD and BFR for an SCell. As described above, an SCell is a secondary component carrier configured for a UE in carrier aggregation.

As shown in FIG. 5, and by reference number 505, the UE may receive BFD reference signals (e.g., a set of BFD-RSs) on the SCell. The UE may perform BFD based at least in part on measurements (e.g., RSRP measurements) performed on the BFD reference signals, in a similar manner as described above. As shown by reference number 510, the UE may detect beam failure on the SCell based at least in part on the measurements performed on the BFD reference signals, in a similar manner as described above.

As shown by reference number 515, the UE may transmit, to a base station on the PCell or PSCell, a link recovery request (LRR). The LRR may be a scheduling request for requesting an uplink grant to schedule an uplink transmission of a BFR MAC control element (MAC-CE). For example, the LRR may be a physical uplink control channel (PUCCH) communication that uses PUCCH format 0 or PUCCH format 1. In some examples, the UE may transmit the LRR on an SCell configured with a PUCCH (PUCCH-SCell), in which PUCCH BFR is configured.

As shown by reference number 520, the base station may transmit, to the UE on the PCell, PSCell, or PUCCH-SCell, an uplink grant based at least in part on the LRR. For example, the uplink grant may be included in DCI with a CRC scrambled with C-RNTI or MCS-C-RNTI. The uplink grant may schedule a physical uplink shared channel (PUSCH) resource in which the UE may transmit the BFR MAC-CE.

As shown by reference number 525, the UE may perform candidate beam detection to select a candidate beam for BFR. The UE may be configured to receive a reference signal (or reference signal set) on each beam of a list of candidate beams. In some examples, the UE may be configured (e.g., using a candidateBeamRSSCellList-r16 parameter) with up to 64 reference signal resources (corresponding to 64 beams). The UE may receive the reference signals on different beams on the failed SCell or another component carrier in a same frequency band as the failed SCell. In this case, the UE is not performing a RACH procedure, so the reference signal resources configured for the candidate beams may not be associated with RACH resources. The UE may select a candidate beam for which a measurement of a corresponding reference signal satisfies a threshold (Qin).

As shown by reference number 530, the UE may transmit, to the base station, the BFR MAC-CE. For example, the UE may transmit the BFR MAC-CE using the PUSCH resource scheduled by the uplink grant. Alternatively, in some examples, if the UE has an already scheduled uplink grant, the UE may transmit the BFR MAC-CE in the already scheduled uplink grant without transmitting the LRR (described in connection with reference number 515) or receiving the uplink grant (described in connection with reference number 520). The BFR MAC-CE may include an indication of the failed SCell (e.g., an index of the SCell) and an indication of the selected candidate beam for the SCell. Because the BFR MAC-CE may be transmitted in a scheduled PUSCH resource, the BFR MAC-CE may be transmitted on any cell, including the SCell.

As shown by reference number 535, the UE may receive, from the base station, a BFR response. In this case, the BFR response may be a response to the BFR MAC-CE. The response to the BFR MAC-CE may be an uplink grant to schedule a new transmission (e.g., with a toggled new data indicator (NDI)) for a same hybrid automatic repeat request (HARQ) process as the PUSCH transmission carrying the BFR MAC-CE. In a case in which a new beam (e.g., the selected beam candidate) is reported in the BFR MAC-CE, after a particular number of symbols (e.g., 28 symbols) from the end of the BFR response (e.g., the end of the PDCCH communication), all CORESET beams on the failed SCell may be reset to the new beam. In a case in which the new beam is reported in the BFR MAC-CE, after the particular number of symbols from the end of the BFR response, PUCCH beams on the failed SCell may be reset to the new beam. This case may be applicable if the failed SCell is a PUCCH-SCell, if spatial relationship information for the PUCCH beams is configured (e.g., using a PUCCH-spatialRelationInfo parameter), and if the LRR is not transmitted on the failed SCell.

As indicated above, FIG. 5 is provided as an example. Other examples may differ from what is described with respect to FIG. 5.

Figure 6:
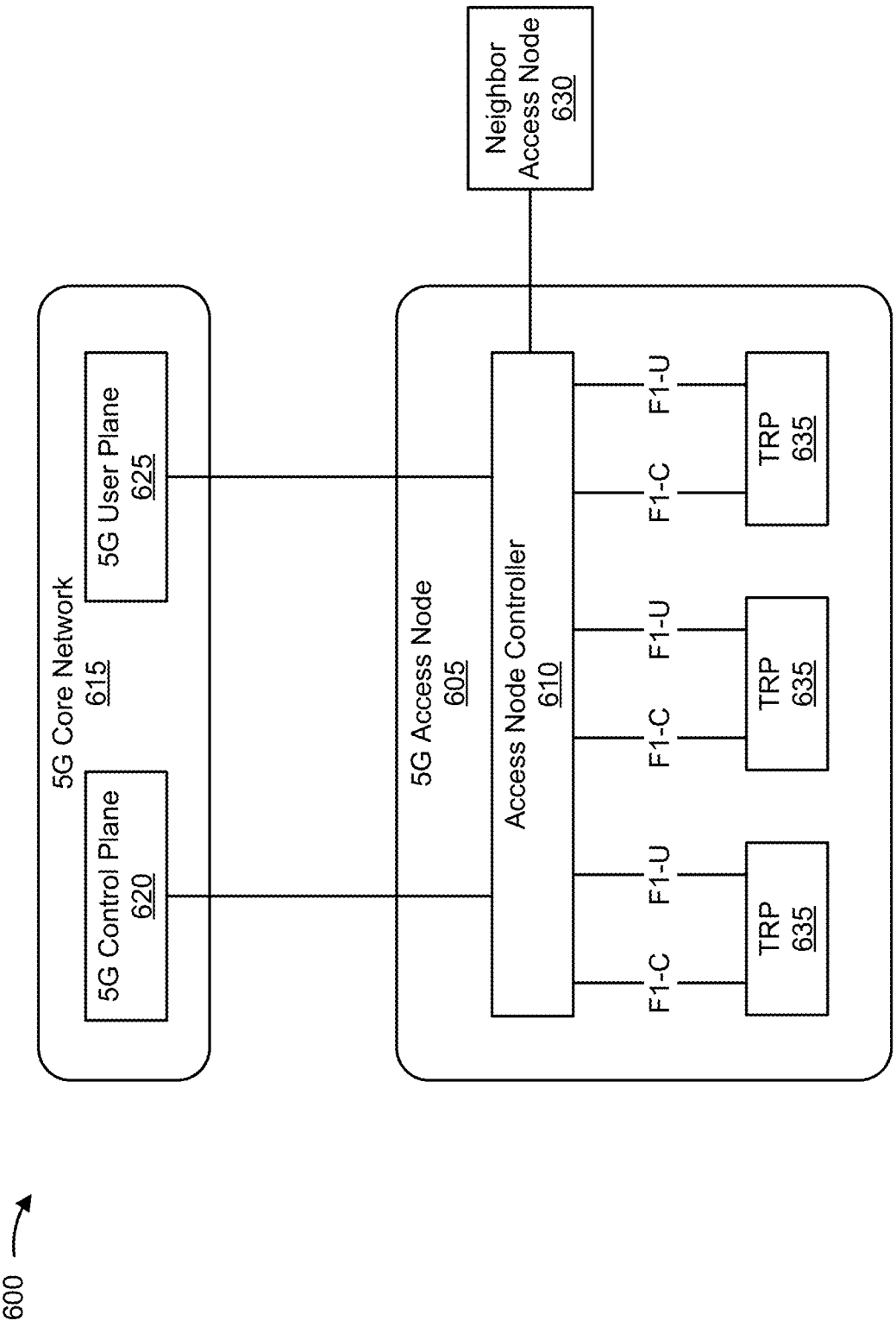
FIG. 6 is a diagram illustrating an example logical architecture of a distributed radio access network, in accordance with the present disclosure.

FIG. 6 is a diagram illustrating an example logical architecture of a distributed radio access network (RAN) 600, in accordance with the present disclosure.

A 5G access node 605 may include an access node controller 610. The access node controller 610 may be a central unit (CU) of the distributed RAN 600. In some aspects, a backhaul interface to a 5G core network 615 may terminate at the access node controller 610. The 5G core network 615 may include a 5G control plane component 620 and a 5G user plane component 625 (e.g., a 5G gateway), and the backhaul interface for one or both of the 5G control plane and the 5G user plane may terminate at the access node controller 610. Additionally, or alternatively, a backhaul interface to one or more neighbor access nodes 630 (e.g., another 5G access node 605 and/or an LTE access node) may terminate at the access node controller 610.

The access node controller 610 may include and/or may communicate with one or more TRPs 635 (e.g., via an F1 Control (F1-C) interface and/or an F1 User (F1-U) interface). A TRP 635 may be a distributed unit (DU) of the distributed RAN 600. In some aspects, a TRP 635 may correspond to a base station 110 described above in connection with FIG. 1. For example, different TRPs 635 may be included in different base stations 110. Additionally, or alternatively, multiple TRPs 635 may be included in a single base station 110. In some aspects, a base station 110 may include a CU (e.g., access node controller 610) and/or one or more DUs (e.g., one or more TRPs 635). In some cases, a TRP 635 may be referred to as a cell, a panel, an antenna array, or an array.

A TRP 635 may be connected to a single access node controller 610 or to multiple access node controllers 610. In some aspects, a dynamic configuration of split logical functions may be present within the architecture of distributed RAN 600. For example, a PDCP layer, an RLC layer, and/or a MAC layer may be configured to terminate at the access node controller 610 or at a TRP 635.

In some aspects, multiple TRPs 635 may transmit communications (e.g., the same communication or different communications) in the same transmission time interval (TTI) (e.g., a slot, a mini-slot, a subframe, or a symbol) or different TTIs using different QCL relationships (e.g., different spatial parameters, different TCI states, different precoding parameters, and/or different beamforming parameters). In some aspects, a TCI state may be used to indicate one or more QCL relationships. A TRP 635 may be configured to individually (e.g., using dynamic selection) or jointly (e.g., using joint transmission with one or more other TRPs 635) serve traffic to a UE 120.

As indicated above, FIG. 6 is provided as an example. Other examples may differ from what was described with regard to FIG. 6.

Figure 7:
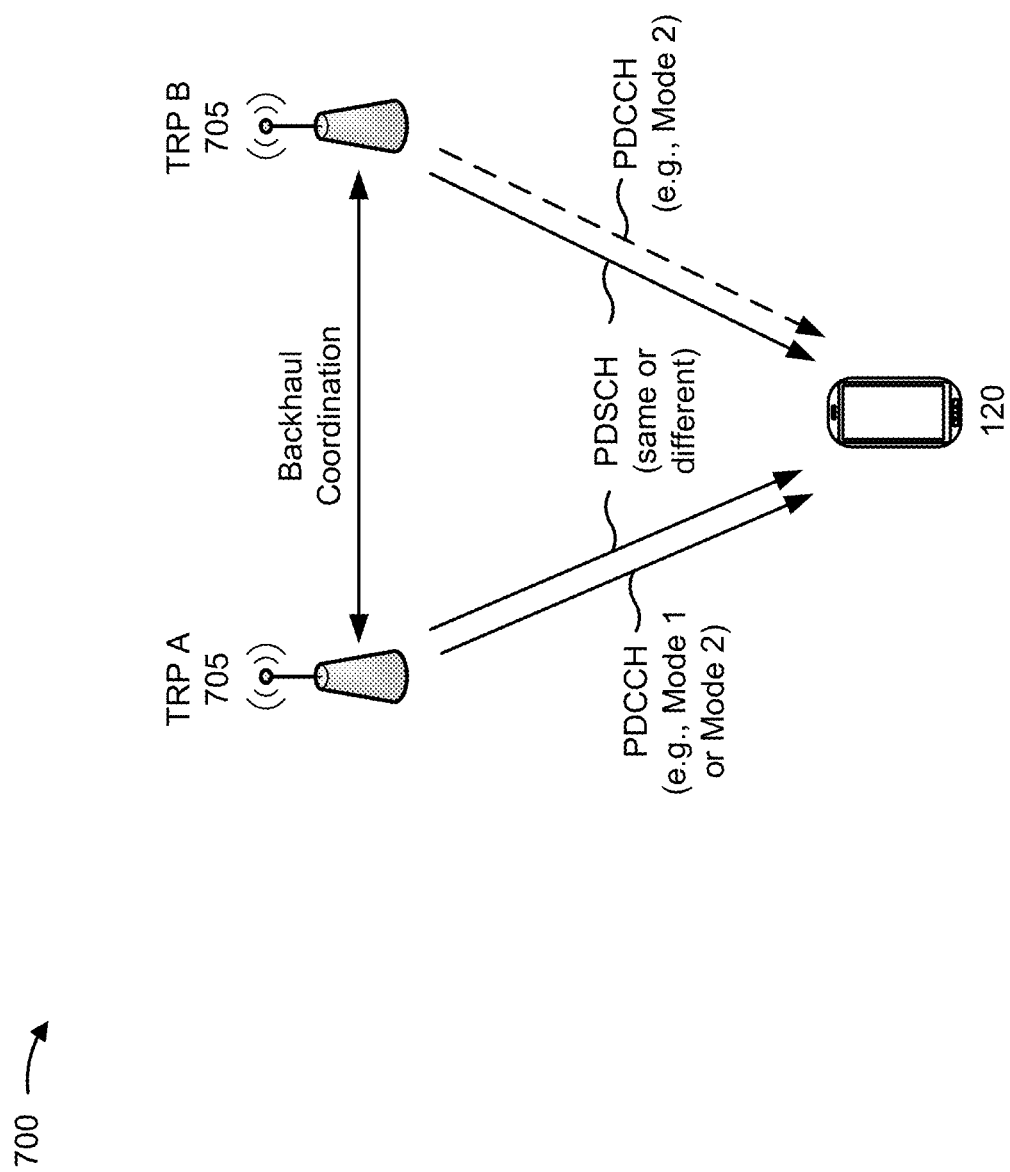
FIG. 7 is a diagram illustrating an example 700 of multi-TRP communication, in accordance with the present disclosure.

FIG. 7 is a diagram illustrating an example 700 of multi-TRP communication (sometimes referred to as multi-panel communication), in accordance with the present disclosure. As shown in FIG. 7, multiple TRPs 705 may communicate with the same UE 120. A TRP 705 may correspond to a TRP 635 described above in connection with FIG. 6.

The multiple TRPs 705 (shown as TRP A and TRP B) may communicate with the same UE 120 in a coordinated manner (e.g., using coordinated multipoint transmissions) to improve reliability and/or increase throughput. The TRPs 705 may coordinate such communications via an interface between the TRPs 705 (e.g., a backhaul interface and/or an access node controller 610). The interface may have a smaller delay and/or higher capacity when the TRPs 705 are co-located at the same base station 110 (e.g., when the TRPs 705 are different antenna arrays or panels of the same base station 110), and the interface may have a larger delay and/or lower capacity (as compared to co-location) when the TRPs 705 are located at different base stations 110. The different TRPs 705 may communicate with the UE 120 using different QCL relationships (e.g., different TCI states), different DMRS ports, and/or different layers (e.g., of a multi-layer communication).

In a first multi-TRP transmission mode (e.g., Mode 1), a single PDCCH may be used to schedule downlink data communications for a single PDSCH. In this case, multiple TRPs 705 (e.g., TRP A and TRP B) may transmit communications to the UE 120 on the same PDSCH. For example, a communication may be transmitted using a single codeword with different spatial layers for different TRPs 705 (e.g., where one codeword maps to a first set of layers transmitted by a first TRP 705 and maps to a second set of layers transmitted by a second TRP 705). As another example, a communication may be transmitted using multiple codewords, where different codewords are transmitted by different TRPs 705 (e.g., using different sets of layers). In either case, different TRPs 705 may use different QCL relationships (e.g., different TCI states) for different DMRS ports corresponding to different layers. For example, a first TRP 705 may use a first QCL relationship or a first TCI state for a first set of DMRS ports corresponding to a first set of layers, and a second TRP 705 may use a second (different) QCL relationship or a second (different) TCI state for a second (different) set of DMRS ports corresponding to a second (different) set of layers. In some aspects, a TCI state in DCI (e.g., transmitted on the PDCCH, such as DCI format 1_0 or DCI format 1_1) may indicate the first QCL relationship (e.g., by indicating a first TCI state) and the second QCL relationship (e.g., by indicating a second TCI state). The first and the second TCI states may be indicated using a TCI field in the DCI. In general, the TCI field can indicate a single TCI state (for single-TRP transmission) or multiple TCI states (for multi-TRP transmission as discussed here) in this multi-TRP transmission mode (e.g., Mode 1).

In a second multi-TRP transmission mode (e.g., Mode 2), multiple PDCCHs may be used to schedule downlink data communications for multiple corresponding PDSCHs (e.g., one PDCCH for each PDSCH). In this case, a first PDCCH may schedule a first codeword to be transmitted by a first TRP 705, and a second PDCCH may schedule a second codeword to be transmitted by a second TRP 705. Furthermore, first DCI (e.g., transmitted by the first TRP 705) may schedule a first PDSCH communication associated with a first set of DMRS ports with a first QCL relationship (e.g., indicated by a first TCI state) for the first TRP 705, and second DCI (e.g., transmitted by the second TRP 705) may schedule a second PDSCH communication associated with a second set of DMRS ports with a second QCL relationship (e.g., indicated by a second TCI state) for the second TRP 705. In this case, DCI (e.g., having DCI format 1_0 or DCI format 1_1) may indicate a corresponding TCI state for a TRP 705 corresponding to the DCI. The TCI field of a DCI indicates the corresponding TCI state (e.g., the TCI field of the first DCI indicates the first TCI state, and the TCI field of the second DCI indicates the second TCI state).

In some examples, the UE 120 may be configured to monitor one or more CORESETs associated with the first TRP 705 and one or more CORESETs associated with the second TRP 705. A CORESET may refer to a control region that is structured to support an efficient use of resources, such as by flexible configuration or reconfiguration of resources for one or more PDCCHs associated with a UE. In some aspects, a CORESET may occupy the first symbol of an orthogonal frequency division multiplexing (OFDM) slot, the first two symbols of an OFDM slot, or the first three symbols of an OFDM slot. Thus, a CORESET may include multiple resource blocks (RBs) in the frequency domain, and either one, two, or three symbols in the time domain. In 5G, a quantity of resources included in a CORESET may be flexibly configured, such as by using RRC signaling to indicate a frequency domain region (for example, a quantity of resource blocks) or a time domain region (for example, a quantity of symbols) for the CORESET.

Two or more (for example, up to five) CORESETs may be grouped into a CORESET pool. Each CORESET pool may be associated with a CORESET pool index. In a multi-TRP configuration, each CORESET pool index value may be associated with a particular TRP 705. As an example, the first TRP 705 (TRP A) may be associated with CORESET pool index 0 and the second TRP 705 (TRP B) may be associated with CORESET pool index 1. The UE 120 may be configured by a higher layer parameter, such as PDCCH-Config, with information identifying an association between a TRP and a CORESET pool index value assigned to the TRP. Accordingly, the UE may identify the TRP that transmitted a DCI uplink grant by determining the CORESET identifier of the CORESET in which the PDCCH carrying the DCI uplink grant was transmitted, determining the CORESET pool index value associated with the CORESET pool in which the CORESET identifier is included, and identifying the TRP associated with the CORESET pool index value.

As indicated above, FIG. 7 is provided as an example. Other examples may differ from what is described with respect to FIG. 7.

A cell may serve a UE using different groups of beams. For example, as described above in connection with FIG. 7, each group of beams in a cell may correspond to a respective TRP of multiple TRPs (e.g., up to two TRPs) in the cell. In particular, the beams and/or TCI states for different TRPs may be configured with different CORESET pool identifiers to enable the UE to identify an association with a particular TRP using a CORESET pool identifier, as described above in connection with FIG. 7.

A UE may be configured with different sets of BFD-RSs for different beam groups and/or TRPs in a cell. The UE may monitor the different sets of BFD-RSs to perform per-beam group and/or per-TRP BFD. Upon detecting beam failure for a TRP, the UE may trigger BFR for the TRP (e.g., the UE may perform per-beam group and/or per-TRP BFR). The UE may detect a beam failure for one TRP in a cell without detecting beam failure for another TRP in the cell. Because detecting beam failure for one TRP may not mean that all beams in the cell fail, the UE may be able to transmit a per-TRP BFR request (BFRQ) via another TRP (e.g., via a PUCCH or PUSCH). The BFRQ procedure used for a TRP is similar to the BFRQ procedure used for an SCell, as described above in connection with FIG. 5. For example, the UE may transmit a scheduling request (e.g., an LRR) to a base station (e.g., via the TRP that is not associated with BFD), and the UE may transmit a BFR MAC-CE using a PUSCH resource. In some examples, up to two PUCCH resources for scheduling requests (PUCCH-SR) for per-TRP BFR may be supported.

In some examples relating to BFR for multiple TRPs, two sets of BFD-RSs per bandwidth part (BWP) may be used, and each set of BFD-RSs may include a particular quantity of resources (e.g., which may be a fixed value or according to the UE's capability). Moreover, the quantity of BFD-RSs across all sets of BFD-RSs per downlink BWP may be a fixed value or according to the UE's capability. In some examples relating to BFR for multiple TRPs, sets of BFD-RSs may have one-to-one associations with sets of NBI-RSs.

A set of BFD-RSs for a TRP may be configured for the UE by the base station. Alternatively, the UE may implicitly identify the set of BFD-RSs if the set is not configured for the UE. For example, the set of BFD-RSs for a TRP may include reference signals quasi-co-located with the beams and/or TCI states of one or more CORESETs associated with the TRP. However, in some cases, a quantity of CORESETs configured for a TRP may be greater than a quantity of reference signals included in the set of BFD-RSs. This may result in ambiguity, such that the UE uses the wrong reference signals for BFD.

Similarly, a set of NBI-RSs for a TRP may be configured for the UE by the base station, or the UE may implicitly identify the set of NBI-RSs if the set is not configured for the UE. However, there may be ambiguity regarding whether the set of NBI-RSs can be implicitly identified if the set of BFD-RSs is configured for the UE and/or ambiguity regarding how to implicitly identify the set of NBI-RSs. Accordingly, this ambiguity may result in the UE using the wrong reference signals for BFR.

Some techniques and apparatuses described herein enable identification of reference signals for respective sets of BFD-RSs, and/or respective sets of NBI-RSs, for different TRPs. For example, reference signals for the respective sets of BFD-RSs may be identified in a case when the respective sets of BFD-RSs are not configured. In particular, reference signals for a set of BFD-RSs for a TRP may be identified in a case when a quantity of CORESETs configured for the TRP is greater than a quantity of reference signals that are to be included in the set of BFD-RSs. In some aspects, one or more tiebreak rules may be applied to the reference signals to identify the reference signals that are to be included in the set of BFD-RSs. In another example, reference signals for the respective sets of NBI-RSs may be identified in a case when the respective sets of NBI-RSs are not configured. In some aspects, the respective sets of NBI-RSs may be based at least in part on the respective sets of BFD-RSs. In this way, the ambiguities described above are resolved, thereby improving BFD and BFR operations. Furthermore, some techniques and apparatuses described herein enable reporting of a selected reference signal from a set of NBI-RSs for a TRP using a reduced message size, thereby conserving network resources.

Figure 8:
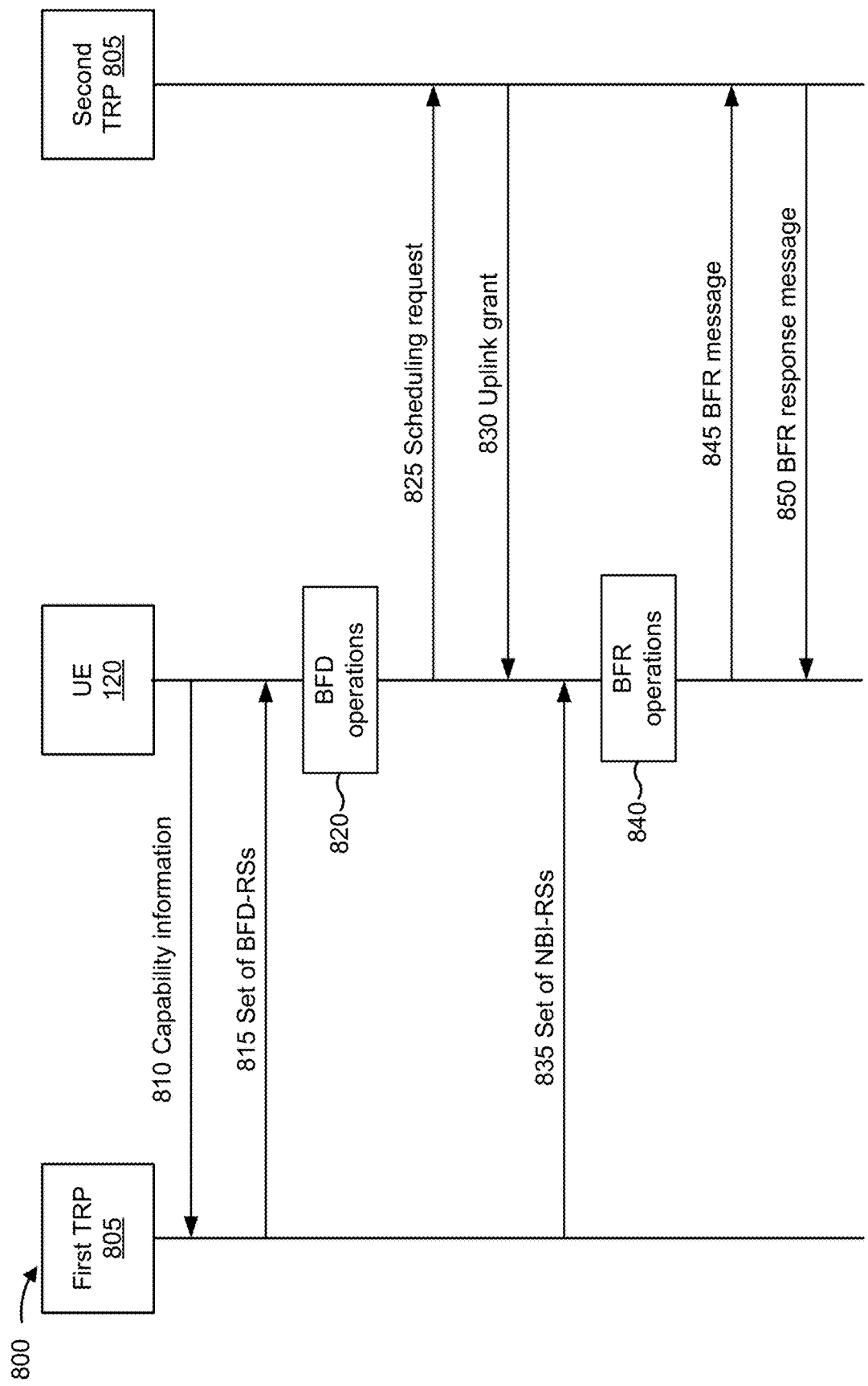
FIG. 8 is a diagram illustrating an example associated with identification of a beam failure detection reference signal (BFD-RS) and a new beam identification reference signal (NBI-RS), in accordance with the present disclosure.

FIG. 8 is a diagram illustrating an example 800 associated with identification of a BFD-RS and an NBI-RS, in accordance with the present disclosure. As shown in FIG. 8, a UE 120 may communicate with a base station 110 via one or more of a first TRP 805 or a second TRP 805. A TRP 805 may correspond to a TRP 635 and/or a TRP 705, as described above. The description to follow is with respect to identification of a set of BFD-RSs and/or a set of NBI-RSs of the first TRP 805, but is equally applicable to identification of a set of BFD-RSs and/or a set of NBI-RSs of the second TRP 805. In other words, identification of a set of BFD-RSs and/or a set of NBI-RSs, described herein, is per TRP.

As shown by reference number 810, the UE 120 may transmit, and the base station 110 may receive (e.g., via the first TRP 805 or the second TRP 805), capability information. The capability information may indicate a capability of the UE 120. The capability information may identify a quantity of reference signals (supported by the UE 120) for a set of BFD-RSs in a component carrier, a quantity of reference signals (supported by the UE 120) for a set of NBI-RSs in a component carrier, a quantity of reference signals (supported by the UE 120) across both a set of BFD-RSs and a set of NBI-RSs in a component carrier, a quantity of reference signals (supported by the UE 120) for a set of BFD-RSs over multiple component carriers, a quantity of reference signals (supported by the UE 120) for a set of NBI-RSs over multiple component carriers, or a quantity of reference signals (supported by the UE 120) across both a set of BFD-RSs and a set of NBI-RSs over multiple component carriers. In some aspects, the quantity of reference signals for a set of BFD-RSs (e.g., the maximum quantity supported by the UE 120) is based at least in part on (e.g., is no more than) a quantity of CORESETs supported by the UE 120 per CORESET pool index (e.g., for multi-DCI multi-TRP).

As shown by reference number 815, the base station 110 may transmit, and the UE 120 may receive, a set of BFD-RSs associated with the first TRP 805. For example, the base station 110 may transmit the set of BFD-RSs via the first TRP 805. In some aspects, the set of BFD-RSs of the first TRP 805 may be configured for the UE 120. In some other aspects, the set of BFD-RSs of the first TRP 805 may not be configured for the UE 120. In other words, the reference signals that are included in the set of BFD-RSs of the first TRP 805 may not be configured for the UE 120. Thus, the UE 120 may determine (e.g., using an implicit rule) the reference signals (e.g., reference signal indices, reference signal resources, or the like) of the set of BFD-RSs of the first TRP 805. For example, the set of BFD-RSs of the first TRP 805 may include reference signals indicated by active TCI states for CORESETs of the first TRP 805 that are monitored by the UE 120. In other words, the reference signals may be those that are quasi-co-located (e.g., QCL Type D) with the CORESETs of the first TRP 805.

In some examples, a plurality of reference signals are indicated by the active TCI states for a plurality of CORESETs of the first TRP 805 that are monitored by the UE 120. In some examples, a quantity of CORESETs, of the plurality of CORESETs, is greater than a quantity of reference signals in the set of BFD-RSs of the first TRP 805. That is, the UE 120 may be unable to identify which reference signals, of the plurality of reference signals, are to be included in the set of BFD-RSs of the first TRP 805 using the implicit rule (described above) alone (e.g., because more CORESETs are configured for the first TRP 805 than the quantity of reference signals in the set of BFD-RSs of the first TRP 805). In some aspects, the quantity of reference signals in a set of BFD-RSs of a TRP may be indicated by a configuration for the UE 120 (e.g., transmitted by the base station 110) and/or by information stored by the UE 120 and/or the base station 110 (e.g., the information indicates that if a set of BFD-RSs of a TRP is not configured for the UE 120, then the set of BFD-RSs is to include two reference signals, or the like).

The UE 120 may identify the reference signals, of the plurality of reference signals, that are included in the set of BFD-RSs of the first TRP 805 using one or more tiebreak rules. That is, a tiebreak rule may enable the UE 120 to identify one or more first reference signals, of the plurality of reference signals, that are to be included in the set of BFD-RSs, and one or more second reference signals, of the plurality of reference signals, that are not to be included in the set of BFD-RSs (e.g., when more CORESETs are configured for the first TRP 805 than the quantity of reference signals in the set of BFD-RSs of the first TRP 805).

In some aspects, according to a first tiebreak rule, the set of BFD-RSs includes one or more first reference signals, of the plurality of reference signals, and does not include one or more second reference signals, of the plurality of reference signals, based at least in part on periodicities of the plurality of reference signals (e.g., periodicities of CSI-RSs or SSBs). For example, the first tiebreak rule may indicate that reference signals associated with the lowest periodicities (e.g., that are transmitted most frequently) are to be included in the set of BFD-RSs. As an example, if the plurality of reference signals includes three reference signals with periodicities of four slots, six slots, and eight slots, respectively, and if the quantity of reference signals indicated for the set of BFD-RSs is two reference signals, then the UE 120 may identify the reference signals with the periodicities of four slots and six slots for the set of BFD-RSs.

In some aspects, according to a second tiebreak rule, the set of BFD-RSs includes one or more first reference signals, of the plurality of reference signals, and does not include one or more second reference signals, of the plurality of reference signals, based at least in part on identifiers of the plurality of CORESETs (e.g., based at least in part on a chronological or reverse-chronological ordering of the identifiers of the plurality of CORESETs). For example, the second tiebreak rule may indicate that reference signals associated with CORESETs associated with the lowest CORESET identifiers are to be included in the set of BFD-RSs. As an example, if the plurality of reference signals includes three reference signals associated with a first CORESET with an identifier of one, a second CORESET with an identifier of two, and a third CORESET with an identifier of three, respectively, and if the quantity of reference signals indicated for the set of BFD-RSs is two reference signals, then the UE 120 may identify the reference signals associated with the first CORESET and the second CORESET for the set of BFD-RSs.

In some aspects, according to a third tiebreak rule, the set of BFD-RSs includes one or more first reference signals, of the plurality of reference signals, and does not include one or more second reference signals, of the plurality of reference signals, based at least in part on a prioritization of the plurality of CORESETs (e.g., the UE 120 may always prioritize particular CORESETs over other CORESETs). For example, the third tiebreak rule may indicate that reference signals associated with CORESETs that are to be prioritized are to be included in the set of BFD-RSs. As an example, if the plurality of reference signals includes three reference signals associated with a first CORESET that is to be prioritized, a second CORESET that is to be prioritized, and a third CORESET that is not to be prioritized, and if the quantity of reference signals indicated for the set of BFD-RSs is two reference signals, then the UE 120 may identify the reference signals associated with the first CORESET and the second CORESET for the set of BFD-RSs. In some aspects, a CORESET that is to be prioritized may be a CORESET used for a single frequency network. Additionally, or alternatively, a CORESET that is to be prioritized may be a CORESET configured with more than one TCI state and/or beam (e.g., the CORESET is used for PDCCH repetition). Additionally, or alternatively, a CORESET that is to be prioritized may be a CORESET that is a broadcast CORESET or a cell-specific CORESET (rather than a UE-specific CORESET).

The first, second, and third tiebreak rules described above are provided as an example, and additional tiebreak rules may also be used to identify the reference signals in the set of BFD-RSs. In some aspects, a single one of the first, second, and third tiebreak rules may be applied to identify the reference signals for the set of BFD-RSs. In some other aspects, a combination of the first, second, and third tiebreak rules may be applied to identify the reference signals for the set of BFD-RSs. In some aspects, the UE 120, and/or the base station 110, may store information that indicates an order in which the first, second, and third tiebreak rules are to be applied to identify the reference signals for the set of BFD-RSs. For example, according to the order, the third tiebreak rule may be applied first, and if there are still more possible reference signals left than the quantity needed for the set of BFD-RSs, then the first tiebreak rule may be applied second, and so forth.

As shown by reference number 820, the UE 120 may perform BFD operations for the first TRP 805, as described above, using the set of BFD-RSs identified for the first TRP 805. For example, the UE 120 may perform measurements of the set of BFD-RSs of the first TRP 805, and the UE 120 may determine beam failure for the first TRP 805 based at least in part on the measurements, in a similar manner as described above. In other words, BFD operations performed by the UE 120 (e.g., reference signal measurement, determination of beam failure, or the like) are per TRP.

As shown by reference number 825, based at least in part on determining beam failure for the first TRP 805, the UE 120 may transmit a scheduling request (e.g., an LRR) to the base station 110 (e.g., via a second TRP 805). The UE 120 may be configured with multiple (e.g., two) uplink resources for scheduling requests (e.g., PUCCH-SRs) in connection with per TRP BFR. For example, the UE 120 may be configured with multiple (e.g., two) PUCCH-SR resources per cell group. Moreover, the network may configure an association between a PUCCH-SR resource (e.g., on a PCell of a primary cell group or a PSCell of a secondary cell group, that is, an "SPCell") and a BFD-RSs set on the same component carrier.

In some aspects, the UE 120 may select an uplink resource, from among multiple (e.g., two) uplink resources for scheduling requests, for transmission of the scheduling request. In some aspects, the UE 120 may transmit the scheduling request in an uplink resource that does not have a configured association with the set of BFD-RSs (e.g., for which the UE 120 determined beam failure). In some aspects, the UE 120 may transmit the scheduling request in an uplink resource that is selected by the UE 120 from the only uplink resource, of the multiple resources, that is not associated with a failed set of BFD-RSs (that is, a set of BFD-RSs for which the UE 120 detected beam failure) on the corresponding component carrier(s). In some aspects, the UE 120 may transmit the scheduling request in an uplink resource that is selected by the UE 120 from multiple uplink resources that are not associated with a failed set of BFD-RSs on the corresponding component carrier(s) (e.g., the selection is by implementation of the UE 120).

In some aspects, the UE 120 may transmit multiple (e.g., two) scheduling requests respectively using the multiple (e.g., two) uplink resources for scheduling requests. That is, the UE 120 may transmit a first scheduling request to the first TRP 805 using a first PUCCH-SR resource, and the UE 120 may transmit a second scheduling request to the second TRP 805 using a second PUCCH-SR resource (e.g., for performing BFR for a single TRP 805, both TRPs 805, or at a cell level). In this way, transmission diversity is improved. The base station 110 may receive the multiple scheduling requests and may transmit a single response to the UE 120 or multiple (e.g., two) responses to the UE 120 (e.g., respectively for each scheduling request transmitted by the UE 120) respectively via the TRPs 805 (e.g., when the TRPs 805 are associated with a non-ideal backhaul condition), in a similar manner as described below. If multiple responses are transmitted to the UE 120 (e.g., indicating multiple uplink grants for the UE 120), the UE 120 may transmit BFR messages (e.g., two BFR messages) to the TRPs 805 using the multiple uplink grants, or the UE 120 may transmit a single BFR message to a single TRP 805 using a single uplink grant, in a similar manner as described below. The single uplink grant may be associated with an earliest transmission occasion of the multiple uplink grants (e.g., the UE 120 may refrain from using a later occasion of the multiple uplink grants if the UE 120 receives acknowledgment (ACK) feedback for the BFR message transmitted using the uplink grant associated with the earliest transmission occasion). The base station 110 may receive the BFR message(s) and may transmit ACK feedback for the BFR message(s). The UE 120 may receive the ACK feedback and may reset a beam used by the UE 120 to the beam indicated in the BFR message(s). The UE 120 may begin using the new beam after a time period (e.g., 28 symbols) after receiving the ACK feedback. A starting time of the time period may be when the UE 120 receives ACK feedback for a first BFR message transmitted by the UE 120 or when the UE 120 receives ACK feedback for multiple BFR messages transmitted by the UE 120.

As shown by reference number 830, based at least in part on transmitting the scheduling request, the UE 120 may receive an uplink grant from the base station 110 (e.g., via the second TRP) for transmission of a BFR message (e.g., a BFR MAC-CE).

As shown by reference number 835, the base station 110 may transmit, and the UE 120 may receive, a set of NBI-RSs associated with the first TRP 805. For example, the base station 110 may transmit the set of NBI-RSs via the first TRP 805. The set of NBI-RSs may be used for BFR operations of the UE 120, as described below. In some aspects, the set of NBI-RSs of the first TRP 805 may be configured for the UE 120. In some aspects, the base station 110 may be required to configure a set of NBI-RSs for a TRP 805 if per TRP BFR is configured for the TRP. In some aspects, the base station 110 may be required to configure a set of NBI-RSs for a TRP 805 if the base station 110 configures a set of BFD-RSs for the TRP 805. For example, the set of NBI-RSs associated with the first TRP 805 is configured for the UE 120 if the set of BFD-RSs associated with the first TRP 805 is configured for the UE 120.

In some aspects, the set of NBI-RSs of the first TRP 805 may not be configured for the UE 120. For example, if the UE 120 implicitly identifies a set of BFD-RSs for a TRP 805, as described above, then the UE 120 may also implicitly identify a set of NBI-RSs for the TRP 805. Thus, the UE 120 may determine (e.g., using an implicit rule) the reference signals (e.g., reference signal indices, reference signal resources, or the like) of the set of NBI-RSs of the first TRP 805. In some aspects, if the set of NBI-RSs of the first TRP 805 is not configured for the UE 120, then the set of NBI-RSs may include all reference signals configured for the UE 120 (e.g., CSI-RSs, SSBs, or the like) other than (e.g., except for) one or more reference signals in the set of BFD-RSs of the first TRP 805. That is, all reference signals configured for the UE 120, other than reference signals in the set of BFD-RSs of the first TRP 805, may be candidate beams for the first TRP 805.

In some aspects, each TRP 805 (e.g., the first TRP 805 and the second TRP 805) may be associated with a physical cell identifier (PCI). In some aspects, if the set of NBI-RSs of the first TRP 805 is not configured for the UE 120, then the set of NBI-RSs may include all SSBs associated with the PCI of the first TRP 805 (e.g., in a case where an SSB cannot be a reference signal for BFD).

As shown by reference number 840, the UE 120 may perform BFR operations for the first TRP 805, as described above, using the set of NBI-RSs identified for the first TRP 805. For example, the UE 120 may perform measurements of the set of NBI-RSs of the first TRP 805, and the UE 120 may determine a candidate beam (e.g., a new beam) for the first TRP 805 based at least in part on the measurements, in a similar manner as described above. In other words, BFR operations performed by the UE 120 (e.g., reference signal measurement, determination of a candidate beam, or the like) are per TRP.

In some aspects, to identify a candidate beam for use with the first TRP 805, the UE 120 may transmit, and the base station 110 may receive, a request for an aperiodic CSI-RS transmission. In some aspects, the request may be, or may be indicated in, a BFRQ (e.g., the scheduling request) transmitted by the UE 120. In response to the request, the base station 110 may transmit (e.g., via the first TRP 805) an aperiodic set of CSI-RSs (e.g., one or more CSI-RSs). The UE 120 may perform measurement of the set of CSI-RSs to identify the candidate beam, in a similar manner as described above.

As shown by reference number 845, the UE 120 may transmit, and the base station 110 may receive (e.g., via the second TRP 805), a BFR message (e.g., a BFR MAC-CE). The UE 120 may transmit the BFR message in a resource indicated by the uplink grant provided in response to the scheduling request. As described above, the UE 120 may indicate the candidate beam selected by the UE 120 for the first TRP 805 in the BFR message. For example, the UE 120 may indicate the candidate beam by indicating a reference signal (e.g., a reference signal index, a reference signal resource identifier, or the like) of the set of NBI-RSs of the first TRP 805 in the BFR message.

In some aspects, the UE 120 may indicate the reference signal using an NBI-RS identifier for the reference signal. In some aspects, reference signals of the set of NBI-RSs of the first TRP 805 may be associated with NBI-RS identifiers that are used independently within the set of NBI-RSs of the first TRP 805 and another set of NBI-RSs associated with the second TRP 805. As an example, the reference signals of the set of NBI-RSs of the first TRP 805 may be associated with identifiers 1-5, and the reference signals of the set of NBI-RSs of the second TRP 805 may also be associated with identifiers 1-5. In some aspects, reference signals of the set of NBI-RSs of the first TRP 805 are associated with NBI-RS identifiers that are used across both the set of NBI-RSs of the first TRP 805 and another set of NBI-RSs associated with the second TRP 805. As an example, the reference signals of the set of NBI-RSs of the first TRP 805 may be associated with identifiers 1-5, and the reference signals of the set of NBI-RSs of the second TRP 805 may be associated with identifiers 6-10. In some aspects, the UE 120 may indicate a reference signal of a set of NBI-RSs using an NBI-RS identifier when the set of NBI-RSs is configured for the UE 120.

In some aspects, the UE 120 may indicate the reference signal using an original resource identifier for the reference signal. For example, the UE 120 may indicate the reference signal using an SSB identifier of the reference signal, a CSI-RS identifier of the reference signal, or the like. In some aspects, the UE 120 may indicate a reference signal of a set of NBI-RSs using an original resource identifier when the set of NBI-RSs is not configured for the UE 120 (e.g., the set of NBI-RSs is implicitly identified).

As shown by reference number 850, the base station 110 may transmit (e.g., via the second TRP 805), and the UE 120 may receive, a BFR response message. The BFR response message may include an uplink grant for a transmission of the UE 120 (e.g., using the candidate beam selected by the UE 120 for the first TRP 805).

As indicated above, FIG. 8 is provided as an example. Other examples may differ from what is described with respect to FIG. 8.

Figure 9:
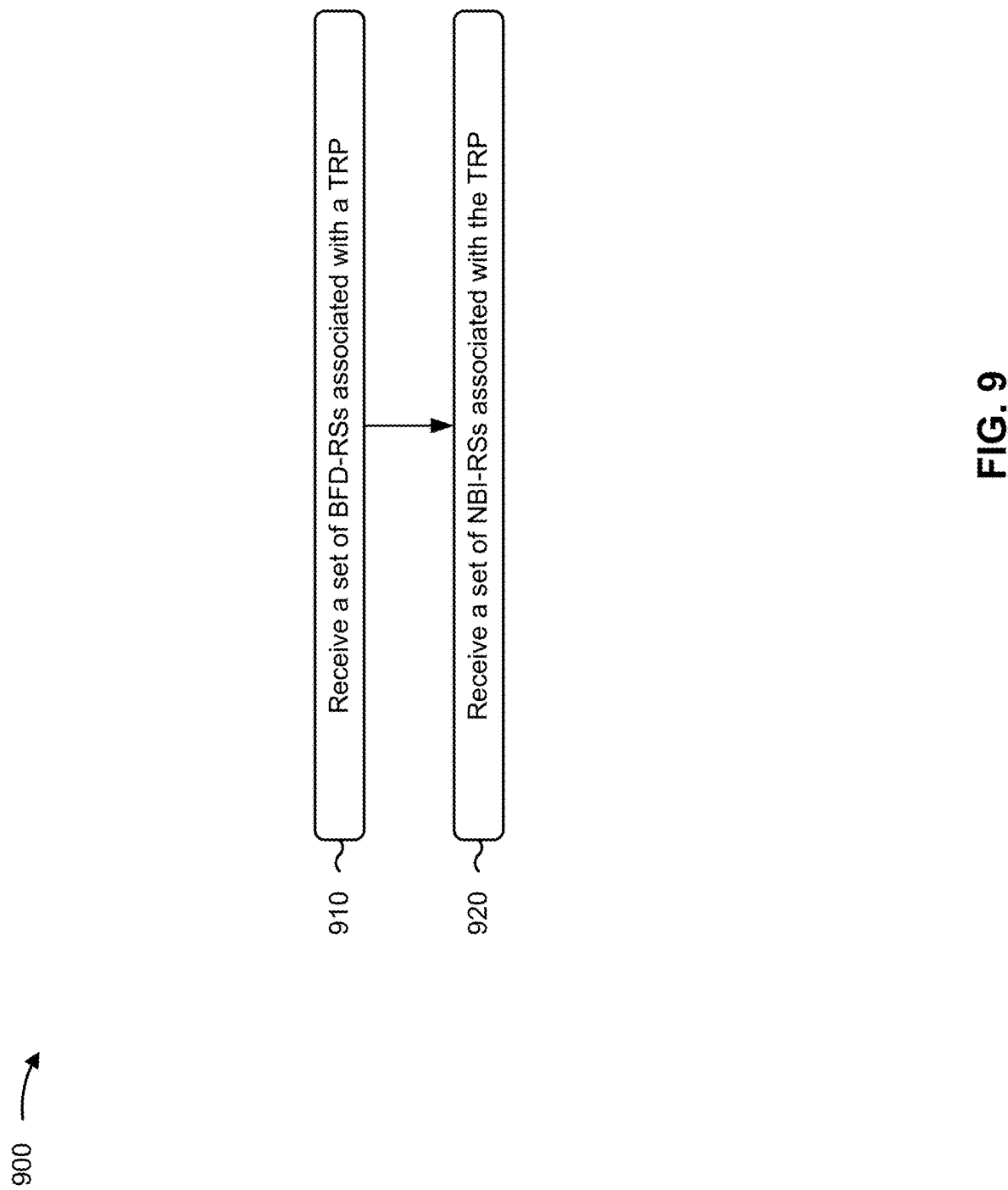
FIGS. 9-10 are diagrams illustrating example processes associated with identification of a BFD-RS and an NBI-RS, in accordance with the present disclosure.

FIG. 9 is a diagram illustrating an example process 900 performed, for example, by a UE, in accordance with the present disclosure. Example process 900 is an example where the UE (e.g., UE 120) performs operations associated with identification of a beam failure detection reference signal and a new beam identification reference signal.

As shown in FIG. 9, in some aspects, process 900 may include receiving a set of BFD-RSs associated with a TRP (block 910). For example, the UE (e.g., using communication manager 140 and/or reception component 1102, depicted in FIG. 11) may receive a set of BFD-RSs associated with a TRP, as described above.

As further shown in FIG. 9, in some aspects, process 900 may include receiving a set of NBI-RSs associated with the TRP (block 920). For example, the UE (e.g., using communication manager 140 and/or reception component 1102, depicted in FIG. 11) may receive a set of NBI-RSs associated with the TRP, as described above.

Process 900 may include additional aspects, such as any single aspect or any combination of aspects described below and/or in connection with one or more other processes described elsewhere herein.

In a first aspect, the set of BFD-RSs is not configured for the UE, and the set of BFD-RSs includes reference signals indicated by active transmission configuration indicator states for control resource sets of the TRP that are monitored by the UE.

In a second aspect, alone or in combination with the first aspect, a plurality of reference signals are indicated by active transmission configuration indicator states for a plurality of CORESETs of the TRP that are monitored by the UE, wherein a quantity of CORESETs, of the plurality of CORESETs, is greater than a quantity of reference signals in the set of BFD-RSs, and wherein the set of BFD-RSs includes one or more first reference signals, of the plurality of reference signals, and does not include one or more second reference signals, of the plurality of reference signals, based at least in part on periodicities of the plurality of reference signals.

In a third aspect, alone or in combination with one or more of the first and second aspects, a plurality of reference signals are indicated by active transmission configuration indicator states for a plurality of CORESETs of the TRP that are monitored by the UE, wherein a quantity of CORESETs, of the plurality of CORESETs, is greater than a quantity of reference signals in the set of BFD-RSs, and wherein the set of BFD-RSs includes one or more first reference signals, of the plurality of reference signals, and does not include one or more second reference signals, of the plurality of reference signals, based at least in part on identifiers of the plurality of CORESETs.

In a fourth aspect, alone or in combination with one or more of the first through third aspects, a plurality of reference signals are indicated by active transmission configuration indicator states for a plurality of CORESETs of the TRP that are monitored by the UE, wherein a quantity of CORESETs, of the plurality of CORESETs, is greater than a quantity of reference signals in the set of BFD-RSs, and wherein the set of BFD-RSs includes one or more first reference signals, of the plurality of reference signals, and does not include one or more second reference signals, of the plurality of reference signals, based at least in part on a prioritization of the plurality of CORESETs.

In a fifth aspect, alone or in combination with one or more of the first through fourth aspects, the set of NBI-RSs associated with the TRP is configured for the UE if the set of BFD-RSs associated with the TRP is configured for the UE.

In a sixth aspect, alone or in combination with one or more of the first through fifth aspects, if the set of NBI-RSs is not configured for the UE, the set of NBI-RSs includes all reference signals configured for the UE other than one or more reference signals in the set of BFD-RSs or includes all synchronization signal blocks associated with a physical cell identifier associated with the TRP.

Figure 11:
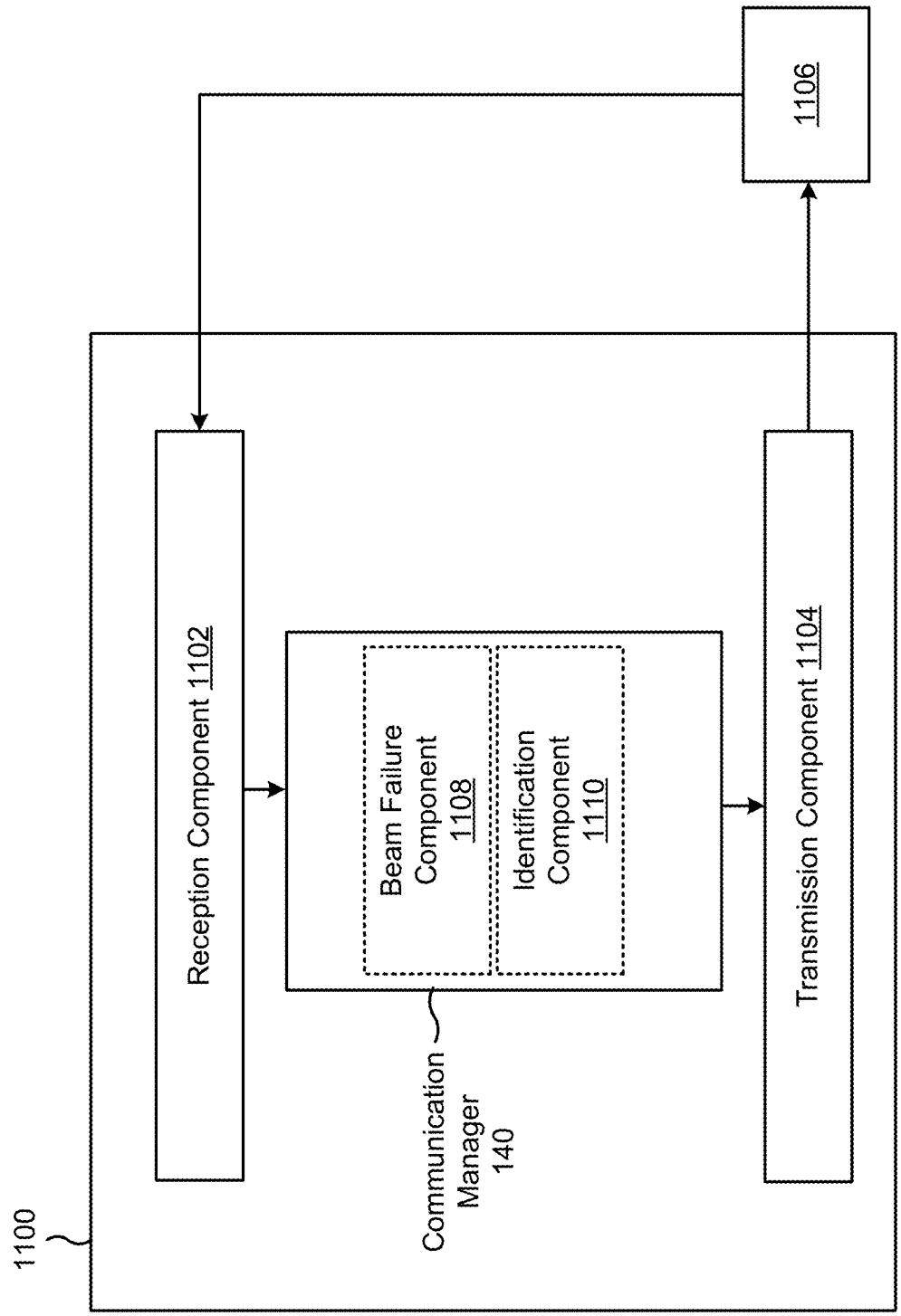
FIGS. 11-12 are diagrams of example apparatuses for wireless communication, in accordance with the present disclosure.

In a seventh aspect, alone or in combination with one or more of the first through sixth aspects, process 900 includes transmitting (e.g., using communication manager 140 and/or transmission component 1104, depicted in FIG. 11) a beam failure recovery message that indicates a reference signal of the set of NBI-RSs, wherein the reference signal is indicated using an NBI-RS identifier, and wherein reference signals of the set of NBI-RSs are associated with NBI-RS identifiers that are used independently within the set of NBI-RSs and another set of NBI-RSs associated with another TRP.

In an eighth aspect, alone or in combination with one or more of the first through seventh aspects, process 900 includes transmitting (e.g., using communication manager 140 and/or transmission component 1104, depicted in FIG. 11) a beam failure recovery message that indicates a reference signal of the set of NBI-RSs, wherein the reference signal is indicated using an NBI-RS identifier, and wherein reference signals of the set of NBI-RSs are associated with NBI-RS identifiers that are used across both the set of NBI-RSs and another set of NBI-RSs associated with another TRP.

In a ninth aspect, alone or in combination with one or more of the first through eighth aspects, process 900 includes transmitting (e.g., using communication manager 140 and/or transmission component 1104, depicted in FIG. 11) a beam failure recovery message that indicates a reference signal of the set of NBI-RSs, wherein the reference signal is indicated using an original resource identifier for the reference signal.

In a tenth aspect, alone or in combination with one or more of the first through ninth aspects, process 900 includes transmitting (e.g., using communication manager 140 and/or transmission component 1104, depicted in FIG. 11) capability information that identifies one or more of a quantity of reference signals for the set of BFD-RSs in a component carrier, a quantity of reference signals for the set of NBI-RSs in a component carrier, a quantity of reference signals across both the set of BFD-RSs and the set of NBI-RSs in a component carrier, a quantity of reference signals for the set of BFD-RSs over multiple component carriers, a quantity of reference signals for the set of NBI-RSs over multiple component carriers, or a quantity of reference signals across both the set of BFD-RSs and the set of NBI-RSs over multiple component carriers.

In an eleventh aspect, alone or in combination with one or more of the first through tenth aspects, process 900 includes transmitting (e.g., using communication manager 140 and/or transmission component 1104, depicted in FIG. 11), based at least in part on identifying beam failure for the set of BFD-RSs, a scheduling request in an uplink resource that does not have a configured association with the set of BFD-RSs, wherein the uplink resource is an only uplink resource that is not associated with a failed set of BFD-RSs, or the uplink resource is selected from multiple uplink resources that are not associated with a failed set of BFD-RSs.

In a twelfth aspect, alone or in combination with one or more of the first through eleventh aspects, process 900 includes transmitting (e.g., using communication manager 140 and/or transmission component 1104, depicted in FIG. 11) a request for an aperiodic CSI-RS transmission for use in identifying a new beam for use with the TRP.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
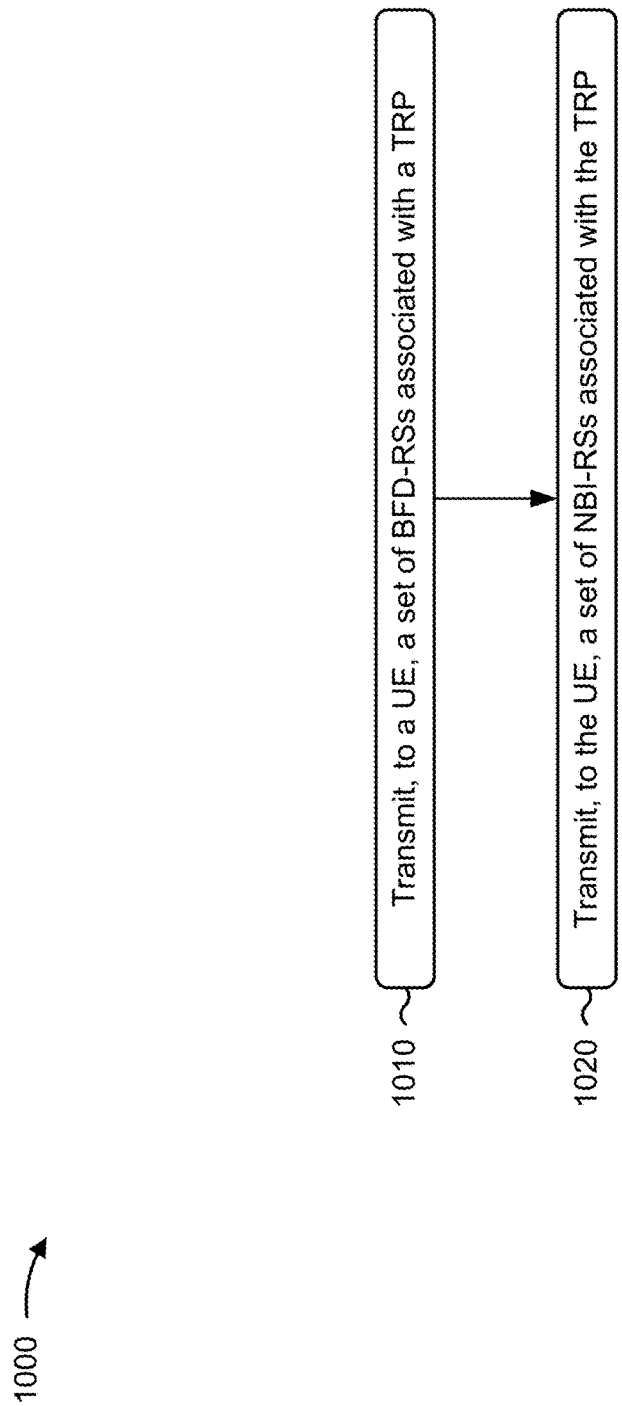

FIG. 10 is a diagram illustrating an example process 1000 performed, for example, by a base station, in accordance with the present disclosure. Example process 1000 is an example where the base station (e.g., base station 110) performs operations associated with identification of a beam failure detection reference signal and a new beam identification reference signal.

As shown in FIG. 10, in some aspects, process 1000 may include transmitting, to a UE, a set of BFD-RSs associated with a TRP (block 1010). For example, the base station (e.g., using communication manager 150 and/or transmission component 1204, depicted in FIG. 12) may transmit, to a UE, a set of BFD-RSs associated with a TRP, as described above.

As further shown in FIG. 10, in some aspects, process 1000 may include transmitting, to the UE, a set of NBI-RSs associated with the TRP (block 1020). For example, the base station (e.g., using communication manager 150 and/or transmission component 1204, depicted in FIG. 12) may transmit, to the UE, a set of NBI-RSs associated with the TRP, as described above.

Process 1000 may include additional aspects, such as any single aspect or any combination of aspects described below and/or in connection with one or more other processes described elsewhere herein.

In a first aspect, the set of BFD-RSs is not configured for the UE, and the set of BFD-RSs includes reference signals indicated by active transmission configuration indicator states for control resource sets of the TRP that are monitored by the UE.

In a second aspect, alone or in combination with the first aspect, a plurality of reference signals are indicated by active transmission configuration indicator states for a plurality of CORESETs of the TRP that are monitored by the UE, wherein a quantity of CORESETs, of the plurality of CORESETs, is greater than a quantity of reference signals in the set of BFD-RSs, and wherein the set of BFD-RSs includes one or more first reference signals, of the plurality of reference signals, and does not include one or more second reference signals, of the plurality of reference signals, based at least in part on periodicities of the plurality of reference signals.

In a third aspect, alone or in combination with one or more of the first and second aspects, a plurality of reference signals are indicated by active transmission configuration indicator states for a plurality of CORESETs of the TRP that are monitored by the UE, wherein a quantity of CORESETs, of the plurality of CORESETs, is greater than a quantity of reference signals in the set of BFD-RSs, and wherein the set of BFD-RSs includes one or more first reference signals, of the plurality of reference signals, and does not include one or more second reference signals, of the plurality of reference signals, based at least in part on identifiers of the plurality of CORESETs.

In a fourth aspect, alone or in combination with one or more of the first through third aspects, a plurality of reference signals are indicated by active transmission configuration indicator states for a plurality of CORESETs of the TRP that are monitored by the UE, wherein a quantity of CORESETs, of the plurality of CORESETs, is greater than a quantity of reference signals in the set of BFD-RSs, and wherein the set of BFD-RSs includes one or more first reference signals, of the plurality of reference signals, and does not include one or more second reference signals, of the plurality of reference signals, based at least in part on a prioritization of the plurality of CORESETs.

In a fifth aspect, alone or in combination with one or more of the first through fourth aspects, the set of NBI-RSs associated with the TRP is configured for the UE if the set of BFD-RSs associated with the TRP is configured for the UE.

In a sixth aspect, alone or in combination with one or more of the first through fifth aspects, if the set of NBI-RSs is not configured for the UE, the set of NBI-RSs includes all reference signals configured for the UE other than one or more reference signals in the set of BFD-RSs or includes all synchronization signal blocks associated with a physical cell identifier associated with the TRP.

Figure 12:
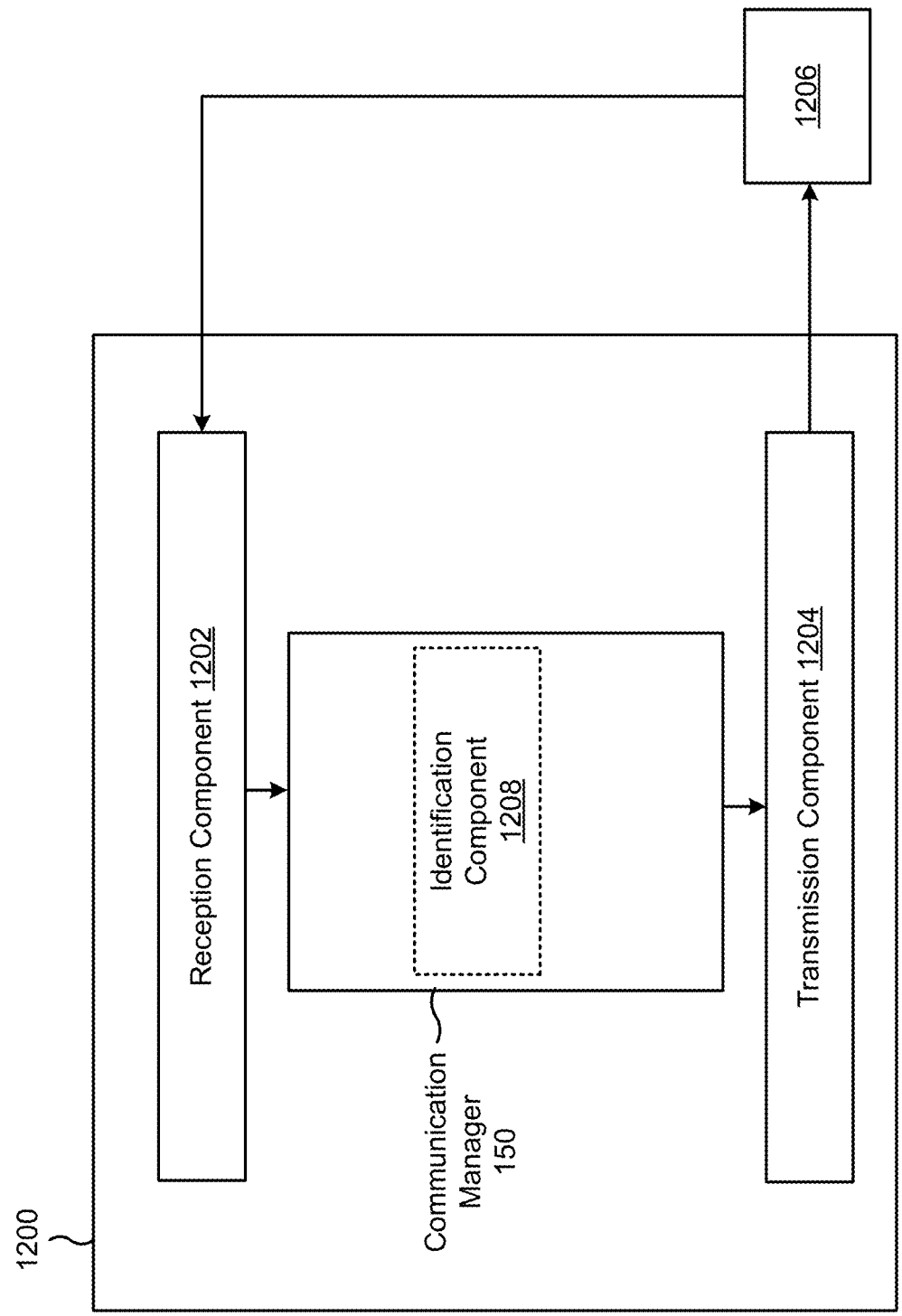

In a seventh aspect, alone or in combination with one or more of the first through sixth aspects, process 1000 includes receiving (e.g., using communication manager 150 and/or reception component 1202, depicted in FIG. 12) a beam failure recovery message that indicates a reference signal of the set of NBI-RSs, wherein the reference signal is indicated using an NBI-RS identifier, and wherein reference signals of the set of NBI-RSs are associated with NBI-RS identifiers that are used independently within the set of NBI-RSs and another set of NBI-RSs associated with another TRP.

In an eighth aspect, alone or in combination with one or more of the first through seventh aspects, process 1000 includes receiving (e.g., using communication manager 150 and/or reception component 1202, depicted in FIG. 12) a beam failure recovery message that indicates a reference signal of the set of NBI-RSs, wherein the reference signal is indicated using an NBI-RS identifier, and wherein reference signals of the set of NBI-RSs are associated with NBI-RS identifiers that are used across the set of NBI-RSs and another set of NBI-RSs associated with another TRP.

In a ninth aspect, alone or in combination with one or more of the first through eighth aspects, process 1000 includes receiving (e.g., using communication manager 150 and/or reception component 1202, depicted in FIG. 12) a beam failure recovery message that indicates a reference signal of the set of NBI-RSs, wherein the reference signal is indicated using an original resource identifier for the reference signal.

In a tenth aspect, alone or in combination with one or more of the first through ninth aspects, process 1000 includes receiving (e.g., using communication manager 150 and/or reception component 1202, depicted in FIG. 12) capability information that identifies one or more of a quantity of reference signals for the set of BFD-RSs in a component carrier, a quantity of reference signals for the set of NBI-RSs in a component carrier, a quantity of reference signals across both the set of BFD-RSs and the set of NBI-RSs in a component carrier, a quantity of reference signals for the set of BFD-RSs over multiple component carriers, a quantity of reference signals for the set of NBI-RSs over multiple component carriers, or a quantity of reference signals across both the set of BFD-RSs and the set of NBI-RSs over multiple component carriers.

In an eleventh aspect, alone or in combination with one or more of the first through tenth aspects, process 1000 includes receiving (e.g., using communication manager 150 and/or reception component 1202, depicted in FIG. 12) a scheduling request in an uplink resource that does not have a configured association with the set of BFD-RSs, wherein the uplink resource is an only uplink resource that is not associated with a failed set of BFD-RSs, or the uplink resource is selected from multiple uplink resources that are not associated with a failed set of BFD-RSs.

In a twelfth aspect, alone or in combination with one or more of the first through eleventh aspects, process 900 includes receiving (e.g., using communication manager 150 and/or reception component 1202, depicted in FIG. 12) a request for an aperiodic CSI-RS transmission for use in identifying a new beam for use with the TRP.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

FIG. 11 is a diagram of an example apparatus 1100 for wireless communication. The apparatus 1100 may be a UE, or a UE may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a base station, or another wireless communication device) using the reception component 1102 and the transmission component 1104. As further shown, the apparatus 1100 may include the communication manager 140. The communication manager 140 may include one or more of a beam failure component 1108 or an identification component 1110, among other examples.

In some aspects, the apparatus 1100 may be configured to perform one or more operations described herein in connection with FIG. 8. Additionally, or alternatively, the apparatus 1100 may be configured to perform one or more processes described herein, such as process 900 of FIG. 9, process 1000 of FIG. 10, or a combination thereof. In some aspects, the apparatus 1100 and/or one or more components shown in FIG. 11 may include one or more components of the UE described in connection with FIG. 2. Additionally, or alternatively, one or more components shown in FIG. 11 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1106. In some aspects, the reception component 1102 may include one or more antennas, a modem, a demodulator, a MIMO detector, a receive processor, a controller/processor, a memory, or a combination thereof, of the UE described in connection with FIG. 2.

The transmission component 1104 may transmit communications, such as reference signals, control information, data communications, or a combination thereof, to the apparatus 1106. In some aspects, one or more other components of the apparatus 1106 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modem, a modulator, a transmit MIMO processor, a transmit processor, a controller/processor, a memory, or a combination thereof, of the UE described in connection with FIG. 2. In some aspects, the transmission component 1104 may be co-located with the reception component 1102 in a transceiver.

The reception component 1102 may receive a set of BFD-RSs associated with a TRP. The reception component 1102 may receive a set of NBI-RSs associated with the TRP. The identification component 1110 may identify reference signals included in the set of BFD-RSs. The identification component 1110 may identify reference signals included in the set of NBI-RSs.

The beam failure component 1108 may perform measurement of the set of BFD-RSs. The beam failure component 1108 may determine beam failure in connection with the TRP. The beam failure component 1108 may perform measurement of the set of NBI-RSs. The beam failure component 1108 may identify a candidate beam for BFR from the set of NBI-RSs.

The transmission component 1104 may transmit a beam failure recovery message that indicates a reference signal of the set of NBI-RSs. The transmission component 1104 may transmit capability information. The transmission component 1104 may transmit, based at least in part on identifying beam failure for the set of BFD-RSs, a scheduling request in an uplink resource. The transmission component 1104 may transmit a request for an aperiodic CSI-RS transmission for use in identifying a new beam for use with the TRP.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

FIG. 12 is a diagram of an example apparatus 1200 for wireless communication. The apparatus 1200 may be a base station, or a base station may include the apparatus 1200. In some aspects, the apparatus 1200 includes a reception component 1202 and a transmission component 1204, which may be in communication with one another (for example, via one or more buses and/or one or more other components). As shown, the apparatus 1200 may communicate with another apparatus 1206 (such as a UE, a base station, or another wireless communication device) using the reception component 1202 and the transmission component 1204. As further shown, the apparatus 1200 may include the communication manager 150. The communication manager 150 may include an identification component 1208, among other examples.

In some aspects, the apparatus 1200 may be configured to perform one or more operations described herein in connection with FIG. 8. Additionally, or alternatively, the apparatus 1200 may be configured to perform one or more processes described herein, such as process 900 of FIG. 9, process 1000 of FIG. 10, or a combination thereof. In some aspects, the apparatus 1200 and/or one or more components shown in FIG. 12 may include one or more components of the base station described in connection with FIG. 2. Additionally, or alternatively, one or more components shown in FIG. 12 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1202 may receive communications, such as reference signals, control information, data communications, or a combination thereof, from the apparatus 1206. The reception component 1202 may provide received communications to one or more other components of the apparatus 1200. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1206. In some aspects, the reception component 1202 may include one or more antennas, a modem, a demodulator, a MIMO detector, a receive processor, a controller/processor, a memory, or a combination thereof, of the base station described in connection with FIG. 2.

The transmission component 1204 may transmit communications, such as reference signals, control information, data communications, or a combination thereof, to the apparatus 1206. In some aspects, one or more other components of the apparatus 1206 may generate communications and may provide the generated communications to the transmission component 1204 for transmission to the apparatus 1206. In some aspects, the transmission component 1204 may perform signal processing on the generated communications (such as filtering, amplification, modulation, digital-to-analog conversion, multiplexing, interleaving, mapping, or encoding, among other examples), and may transmit the processed signals to the apparatus 1206. In some aspects, the transmission component 1204 may include one or more antennas, a modem, a modulator, a transmit MIMO processor, a transmit processor, a controller/processor, a memory, or a combination thereof, of the base station described in connection with FIG. 2. In some aspects, the transmission component 1204 may be co-located with the reception component 1202 in a transceiver.

The transmission component 1204 may transmit, to a UE, a set of BFD-RSs associated with a TRP. The transmission component 1204 may transmit, to the UE, a set of NBI-RSs associated with the TRP. The identification component 1208 may identify reference signals included in the set of BFD-RSs. The identification component 1208 may identify reference signals included in the set of NBI-RSs.

The reception component 1202 may receive a beam failure recovery message that indicates a reference signal of the set of NBI-RSs. The reception component 1202 may receive capability information. The reception component 1202 may receive a scheduling request in an uplink resource. The reception component 1202 may receive a request for an aperiodic CSI-RS transmission for use in identifying a new beam for use with the TRP.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally, or alternatively, a set of (one or more) components shown in FIG. 12 may perform one or more functions described as being performed by another set of components shown in FIG. 12.

The following provides an overview of some Aspects of the present disclosure:

Aspect 1: A method of wireless communication performed by a user equipment (UE), comprising: receiving a set of beam failure detection reference signals (BFD-RSs) associated with a transmit receive point (TRP); and receiving a set of new beam identification reference signals (NBI-RSs) associated with the TRP.

Aspect 2: The method of Aspect 1, wherein the set of BFD-RSs is not configured for the UE, and the set of BFD-RSs includes reference signals indicated by active transmission configuration indicator states for control resource sets of the TRP that are monitored by the UE.

Aspect 3: The method of any of Aspects 1-2, wherein a plurality of reference signals are indicated by active transmission configuration indicator states for a plurality of CORESETs of the TRP that are monitored by the UE, wherein a quantity of CORESETs, of the plurality of CORESETs, is greater than a quantity of reference signals in the set of BFD-RSs, and wherein the set of BFD-RSs includes one or more first reference signals, of the plurality of reference signals, and does not include one or more second reference signals, of the plurality of reference signals, based at least in part on periodicities of the plurality of reference signals.

Aspect 4: The method of any of Aspects 1-3, wherein a plurality of reference signals are indicated by active transmission configuration indicator states for a plurality of CORESETs of the TRP that are monitored by the UE, wherein a quantity of CORESETs, of the plurality of CORESETs, is greater than a quantity of reference signals in the set of BFD-RSs, and wherein the set of BFD-RSs includes one or more first reference signals, of the plurality of reference signals, and does not include one or more second reference signals, of the plurality of reference signals, based at least in part on identifiers of the plurality of CORESETs.

Aspect 5: The method of any of Aspects 1-4, wherein a plurality of reference signals are indicated by active transmission configuration indicator states for a plurality of CORESETs of the TRP that are monitored by the UE, wherein a quantity of CORESETs, of the plurality of CORESETs, is greater than a quantity of reference signals in the set of BFD-RSs, and wherein the set of BFD-RSs includes one or more first reference signals, of the plurality of reference signals, and does not include one or more second reference signals, of the plurality of reference signals, based at least in part on a prioritization of the plurality of CORESETs.

Aspect 6: The method of any of Aspects 1-5, wherein the set of NBI-RSs associated with the TRP is configured for the UE if the set of BFD-RSs associated with the TRP is configured for the UE.

Aspect 7: The method of any of Aspects 1-6, wherein, if the set of NBI-RSs is not configured for the UE, the set of NBI-RSs includes all reference signals configured for the UE other than one or more reference signals in the set of BFD-RSs or includes all synchronization signal blocks associated with a physical cell identifier associated with the TRP.

Aspect 8: The method of any of Aspects 1-7, further comprising: transmitting a beam failure recovery message that indicates a reference signal of the set of NBI-RSs, wherein the reference signal is indicated using an NBI-RS identifier, and wherein reference signals of the set of NBI-RSs are associated with NBI-RS identifiers that are used independently within the set of NBI-RSs and another set of NBI-RSs associated with another TRP.

Aspect 9: The method of any of Aspects 1-7, further comprising: transmitting a beam failure recovery message that indicates a reference signal of the set of NBI-RSs, wherein the reference signal is indicated using an NBI-RS identifier, and wherein reference signals of the set of NBI-RSs are associated with NBI-RS identifiers that are used across both the set of NBI-RSs and another set of NBI-RSs associated with another TRP.

Aspect 10: The method of any of Aspects 1-7, further comprising: transmitting a beam failure recovery message that indicates a reference signal of the set of NBI-RSs, wherein the reference signal is indicated using an original resource identifier for the reference signal.

Aspect 11: The method of any of Aspects 1-10, further comprising: transmitting capability information that identifies one or more of: a quantity of reference signals for the set of BFD-RSs in a component carrier, a quantity of reference signals for the set of NBI-RSs in a component carrier, a quantity of reference signals across both the set of BFD-RSs and the set of NBI-RSs in a component carrier, a quantity of reference signals for the set of BFD-RSs over multiple component carriers, a quantity of reference signals for the set of NBI-RSs over multiple component carriers, or a quantity of reference signals across both the set of BFD-RSs and the set of NBI-RSs over multiple component carriers.

Aspect 12: The method of any of Aspects 1-11, further comprising: transmitting, based at least in part on identifying beam failure for the set of BFD-RSs, a scheduling request in an uplink resource that does not have a configured association with the set of BFD-RSs, wherein the uplink resource is an only uplink resource that is not associated with a failed set of BFD-RSs, or the uplink resource is selected from multiple uplink resources that are not associated with a failed set of BFD-RSs.

Aspect 13: The method of any of Aspects 1-12, further comprising: transmitting a request for an aperiodic channel state information reference signal (CSI-RS) transmission for use in identifying a new beam for use with the TRP.

Aspect 14: A method of wireless communication performed by a base station, comprising: transmitting, to a user equipment (UE), a set of beam failure detection reference signals (BFD-RSs) associated with a transmit receive point (TRP); and transmitting, to the UE, a set of new beam identification reference signals (NBI-RSs) associated with the TRP.

Aspect 15: The method of Aspect 14, wherein the set of BFD-RSs is not configured for the UE, and the set of BFD-RSs includes reference signals indicated by active transmission configuration indicator states for control resource sets of the TRP that are monitored by the UE.

Aspect 16: The method of any of Aspects 14-15, wherein a plurality of reference signals are indicated by active transmission configuration indicator states for a plurality of CORESETs of the TRP that are monitored by the UE, wherein a quantity of CORESETs, of the plurality of CORESETs, is greater than a quantity of reference signals in the set of BFD-RSs, and wherein the set of BFD-RSs includes one or more first reference signals, of the plurality of reference signals, and does not include one or more second reference signals, of the plurality of reference signals, based at least in part on periodicities of the plurality of reference signals.

Aspect 17: The method of any of Aspects 14-16, wherein a plurality of reference signals are indicated by active transmission configuration indicator states for a plurality of CORESETs of the TRP that are monitored by the UE, wherein a quantity of CORESETs, of the plurality of CORESETs, is greater than a quantity of reference signals in the set of BFD-RSs, and wherein the set of BFD-RSs includes one or more first reference signals, of the plurality of reference signals, and does not include one or more second reference signals, of the plurality of reference signals, based at least in part on identifiers of the plurality of CORESETs.

Aspect 18: The method of any of Aspects 14-17, wherein a plurality of reference signals are indicated by active transmission configuration indicator states for a plurality of CORESETs of the TRP that are monitored by the UE, wherein a quantity of CORESETs, of the plurality of CORESETs, is greater than a quantity of reference signals in the set of BFD-RSs, and wherein the set of BFD-RSs includes one or more first reference signals, of the plurality of reference signals, and does not include one or more second reference signals, of the plurality of reference signals, based at least in part on a prioritization of the plurality of CORESETs.

Aspect 19: The method of any of Aspects 14-18, wherein the set of NBI-RSs associated with the TRP is configured for the UE if the set of BFD-RSs associated with the TRP is configured for the UE.

Aspect 20: The method of any of Aspects 14-19, wherein, if the set of NBI-RSs is not configured for the UE, the set of NBI-RSs includes all reference signals configured for the UE other than one or more reference signals in the set of BFD-RSs or includes all synchronization signal blocks associated with a physical cell identifier associated with the TRP.

Aspect 21: The method of any of Aspects 14-20, further comprising: receiving a beam failure recovery message that indicates a reference signal of the set of NBI-RSs, wherein the reference signal is indicated using an NBI-RS identifier, and wherein reference signals of the set of NBI-RSs are associated with NBI-RS identifiers that are used independently within the set of NBI-RSs and another set of NBI-RSs associated with another TRP.

Aspect 22: The method of any of Aspects 14-20, further comprising: receiving a beam failure recovery message that indicates a reference signal of the set of NBI-RSs, wherein the reference signal is indicated using an NBI-RS identifier, and wherein reference signals of the set of NBI-RSs are associated with NBI-RS identifiers that are used across the set of NBI-RSs and another set of NBI-RSs associated with another TRP.

Aspect 23: The method of any of Aspects 14-20, further comprising: receiving a beam failure recovery message that indicates a reference signal of the set of NBI-RSs, wherein the reference signal is indicated using an original resource identifier for the reference signal.

Aspect 24: The method of any of Aspects 14-23, further comprising: receiving capability information that identifies one or more of: a quantity of reference signals for the set of BFD-RSs in a component carrier, a quantity of reference signals for the set of NBI-RSs in a component carrier, a quantity of reference signals across both the set of BFD-RSs and the set of NBI-RSs in a component carrier, a quantity of reference signals for the set of BFD-RSs over multiple component carriers, a quantity of reference signals for the set of NBI-RSs over multiple component carriers, or a quantity of reference signals across both the set of BFD-RSs and the set of NBI-RSs over multiple component carriers.

Aspect 25: The method of any of Aspects 14-24, further comprising: receiving a scheduling request in an uplink resource that does not have a configured association with the set of BFD-RSs, wherein the uplink resource is an only uplink resource that is not associated with a failed set of BFD-RSs, or the uplink resource is selected from multiple uplink resources that are not associated with a failed set of BFD-RSs.

Aspect 26: The method of any of Aspects 14-25, further comprising: receiving a request for an aperiodic channel state information reference signal (CSI-RS) transmission for use in identifying a new beam for use with the TRP.

Aspect 27: An apparatus for wireless communication at a device, comprising a processor; memory coupled with the processor; and instructions stored in the memory and executable by the processor to cause the apparatus to perform the method of one or more of Aspects 1-13.

Aspect 28: A device for wireless communication, comprising a memory and one or more processors coupled to the memory, the one or more processors configured to perform the method of one or more of Aspects 1-13.

Aspect 29: An apparatus for wireless communication, comprising at least one means for performing the method of one or more of Aspects 1-13.

Aspect 30: A non-transitory computer-readable medium storing code for wireless communication, the code comprising instructions executable by a processor to perform the method of one or more of Aspects 1-13.

Aspect 31: A non-transitory computer-readable medium storing a set of instructions for wireless communication, the set of instructions comprising one or more instructions that, when executed by one or more processors of a device, cause the device to perform the method of one or more of Aspects 1-13.

Aspect 32: An apparatus for wireless communication at a device, comprising a processor; memory coupled with the processor; and instructions stored in the memory and executable by the processor to cause the apparatus to perform the method of one or more of Aspects 14-26.

Aspect 33: A device for wireless communication, comprising a memory and one or more processors coupled to the memory, the one or more processors configured to perform the method of one or more of Aspects 14-26.

Aspect 34: An apparatus for wireless communication, comprising at least one means for performing the method of one or more of Aspects 14-26.

Aspect 35: A non-transitory computer-readable medium storing code for wireless communication, the code comprising instructions executable by a processor to perform the method of one or more of Aspects 14-26.

Aspect 36: A non-transitory computer-readable medium storing a set of instructions for wireless communication, the set of instructions comprising one or more instructions that, when executed by one or more processors of a device, cause the device to perform the method of one or more of Aspects 14-26.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a user equipment (UE), comprising:
one or more memories; and
one or more processors, coupled to the one or more memories, configured to:
transmit capability information associated with beam failure recovery for a plurality of transmit receive points (TRPs), wherein the capability information identifies a quantity of reference signals in each set of beam failure detection reference signals (BFD-RSs) associated with a bandwidth part;
receive a set of BFD-RSs, associated with a TRP of the plurality of TRPs, based at least in part on one of:
first periodic reference signal resources configured via a first parameter in a radio resource control (RRC) message, or
a plurality of reference signals indicated by active transmission configuration indicator states for a plurality of control resource sets (CORESETs) of the TRP that are monitored by the UE; and
perform candidate beam detection based at least in part on a set of new beam identification reference signals (NBI-RSs), associated with the TRP, wherein the set of NBI-RSs is based at least in part on second periodic reference signal resources configured by a second RRC parameter, wherein sets of BFD-RSs have one-to-one associations with sets of NBI-RSs.

2. The apparatus of claim 1,
wherein the set of BFD-RSs is not configured for the UE, and
wherein, to receive the set of BFD-RSs, the one or more processors are configured to monitor, for beam failure detection, the plurality of reference signals indicated by the active transmission configuration indicator states for the plurality of CORESETs of the TRP.

3. The apparatus of claim 1,
wherein a quantity of CORESETs, of the plurality of CORESETs, is greater than a quantity of reference signals in the set of BFD-RSs, and
wherein the set of BFD-RSs includes one or more first reference signals, of the plurality of reference signals indicated by the active transmission configuration indicator states, and does not include one or more second reference signals, of the plurality of reference signals indicated by the active transmission configuration indicator states, based at least in part on periodicities of the plurality of reference signals indicated by the active transmission configuration indicator states.

4. The apparatus of claim 1,
wherein a quantity of CORESETs, of the plurality of CORESETs, is greater than a quantity of reference signals in the set of BFD-RSs, and
wherein the set of BFD-RSs includes one or more first reference signals, of the plurality of reference signals indicated by the active transmission configuration indicator states, and does not include one or more second reference signals, of the plurality of reference signals indicated by the active transmission configuration indicator states, based at least in part on identifiers of the plurality of CORESETs.

5. The apparatus of claim 1,
wherein a quantity of CORESETs, of the plurality of CORESETs, is greater than a quantity of reference signals in the set of BFD-RSs, and
wherein the set of BFD-RSs includes one or more first reference signals, of the plurality of reference signals indicated by the active transmission configuration indicator states, and does not include one or more second reference signals, of the plurality of reference signals indicated by the active transmission configuration indicator states, based at least in part on a prioritization of the plurality of CORESETs.

6. The apparatus of claim 1, wherein the set of NBI-RSs associated with the TRP is configured for the UE if the set of BFD-RSs associated with the TRP is configured for the UE.

7. The apparatus of claim 1, wherein, if the set of NBI-RSs is not configured for the UE, the set of NBI-RSs includes all reference signals configured for the UE other than one or more reference signals in the set of BFD-RSs or includes all synchronization signal blocks associated with a physical cell identifier associated with the TRP.

8. The apparatus of claim 1, wherein the one or more processors are further configured to:
transmit a beam failure recovery message that indicates a reference signal of the set of NBI-RSs,
wherein the reference signal is indicated using an NBI-RS identifier, and
wherein reference signals of the set of NBI-RSs are associated with NBI-RS identifiers that are used independently within the set of NBI-RSs and another set of NBI-RSs associated with another TRP.

9. The apparatus of claim 1, wherein the one or more 9. processors are further configured to:
transmit a beam failure recovery message that indicates a reference signal of the set of NBI-RSs,
wherein the reference signal is indicated using an NBI-RS identifier, and
wherein reference signals of the set of NBI-RSs are associated with NBI-RS identifiers that are used across both the set of NBI-RSs and another set of NBI-RSs associated with another TRP.

10. The apparatus of claim 1, wherein the one or more processors are further configured to:
transmit a beam failure recovery message that indicates a reference signal of the set of NBI-RSs,
wherein the reference signal is indicated using an original resource identifier for the reference signal.

11. The apparatus of claim 1, wherein the capability information identifies one or more of:
a quantity of reference signals for the set of NBI-RSs in a component carrier,
a quantity of reference signals across both the set of BFD-RSs and the set of NBI-RSs in a component carrier,
a quantity of reference signals for the set of BFD-RSs over multiple component carriers,
a quantity of reference signals for the set of NBI-RSs over multiple component carriers, or
a quantity of reference signals across both the set of BFD-RSs and the set of NBI-RSs over multiple component carriers.

12. The apparatus of claim 1, wherein the one or more processors are further configured to:
transmit, based at least in part on identifying beam failure for the set of BFD-RSs, a scheduling request in an uplink resource that does not have a configured association with the set of BFD-RSs,
wherein the uplink resource is an only uplink resource that is not associated with a failed set of BFD-RSs, or the uplink resource is selected from multiple uplink resources that are not associated with a failed set of BFD-RSs.

13. The apparatus of claim 1, wherein the capability information identifies a quantity of reference signals across all sets of BFD-RSs associated with the bandwidth part.

14. An apparatus for wireless communication at a base station, comprising:
one or more memories; and
one or more processors, coupled to the one or more memories, configured to:
receive, from a user equipment (UE), capability information associated with beam failure recovery for a plurality of transmit receive points (TRPs), wherein the capability information identifies a quantity of reference signals in each set of beam failure detection reference signals (BFD-RSs) associated with a bandwidth part;
transmit, to the UE, a set of BFD-RSs, associated with a TRP of the plurality of TRPs, based at least in part on one of:
first periodic reference signal resources configured via a first parameter in a radio resource control (RRC) message, or
a plurality of reference signals indicated by active transmission configuration indicator states for a plurality of control resource sets (CORESETs) of the TRP that are monitored by the UE; and
transmit, to the UE, a set of new beam identification reference signals (NBI-RSs), associated with the TRP, based at least in part on second periodic reference signal resources configured by a second RRC parameter, wherein sets of BFD-RSs have one-to-one associations with sets of NBI-RSs.

15. The apparatus of claim 14,
wherein the set of BFD-RSs is not configured for the UE, and
wherein, to transmit the set of BFD-RDs, the one or more processors are configured to transmit, for beam failure detection, the plurality of reference signals indicated by the active transmission configuration indicator states for the plurality of CORESETs of the TRP.

16. The apparatus of claim 14,
wherein a quantity of CORESETs, of the plurality of CORESETs, is greater than a quantity of reference signals in the set of BFD-RSs, and
wherein the set of BFD-RSs includes one or more first reference signals, of the plurality of reference signals indicated by the active transmission configuration indicator states, and does not include one or more second reference signals, of the plurality of reference signals indicated by the active transmission configuration indicator states, based at least in part on periodicities of the plurality of reference signals indicated by the active transmission configuration indicator states.

17. The apparatus of claim 14,
wherein a quantity of CORESETs, of the plurality of CORESETs, is greater than a quantity of reference signals in the set of BFD-RSs, and
wherein the set of BFD-RSs includes one or more first reference signals, of the plurality of reference signals indicated by the active transmission configuration indicator states, and does not include one or more second reference signals, of the plurality of reference signals indicated by the active transmission configuration indicator states, based at least in part on identifiers of the plurality of CORESETs.

18. The apparatus of claim 14,
wherein a quantity of CORESETs, of the plurality of CORESETs, is greater than a quantity of reference signals in the set of BFD-RSs, and
wherein the set of BFD-RSs includes one or more first reference signals, of the plurality of reference signals indicated by the active transmission configuration indicator states, and does not include one or more second reference signals, of the plurality of reference signals indicated by the active transmission configuration indicator states, based at least in part on a prioritization of the plurality of CORESETs.

19. The apparatus of claim 14, wherein the set of NBI-RSs associated with the TRP is configured for the UE if the set of BFD-RSs associated with the TRP is configured for the UE.

20. The apparatus of claim 14, wherein, if the set of NBI-RSs is not configured for the UE, the set of NBI-RSs includes all reference signals configured for the UE other than one or more reference signals in the set of BFD-RSs or includes all synchronization signal blocks associated with a physical cell identifier associated with the TRP.

21. The apparatus of claim 14, wherein the one or more processors are further configured to:
receive a beam failure recovery message that indicates a reference signal of the set of NBI-RSs,
wherein the reference signal is indicated using an NBI-RS identifier, and
wherein reference signals of the set of NBI-RSs are associated with NBI-RS identifiers that are used independently within the set of NBI-RSs and another set of NBI-RSs associated with another TRP.

22. The apparatus of claim 14, wherein the one or more processors are further configured to:
receive a beam failure recovery message that indicates a reference signal of the set of NBI-RSs,
wherein the reference signal is indicated using an NBI-RS identifier, and
wherein reference signals of the set of NBI-RSs are associated with NBI-RS identifiers that are used across both the set of NBI-RSs and another set of NBI-RSs associated with another TRP.

23. The apparatus of claim 14, wherein the one or more processors are further configured to:
receive a beam failure recovery message that indicates a reference signal of the set of NBI-RSs,
wherein the reference signal is indicated using an original resource identifier for the reference signal.

24. The apparatus of claim 14, wherein the one or more processors are further configured to:
receive a scheduling request in an uplink resource that does not have a configured association with the set of BFD-RSs,
wherein the uplink resource is an only uplink resource that is not associated with a failed set of BFD-RSs, or the uplink resource is selected from multiple uplink resources that are not associated with a failed set of BFD-RSs.

25. A method of wireless communication performed by an apparatus of a user equipment (UE), comprising:
transmitting capability information associated with beam failure recovery for a plurality of transmit receive points (TRPs), wherein the capability information identifies a quantity of reference signals in each set of beam failure detection reference signals (BFD-RSs) associated with a bandwidth part;
receiving a set of BFD-RSs, associated with a TRP of the plurality of TRPs, based at least in part on one of:

first periodic reference signal resources configured via a first parameter in a radio resource control (RRC) message, or a plurality of reference signals indicated by active transmission configuration indicator states for a plurality of control resource sets (CORESETs) of the TRP that are monitored by the UE; and performing candidate beam detection based at least in part on a set of new beam identification reference signals (NBI-RSs), associated with the TRP, wherein the set of NBI-RSs is based at least in part on second periodic reference signal resources configured by a second RRC parameter, wherein sets of BFD-RSs have one-to-one associations with sets of NBI-RSs.

26. The method of claim 25, wherein a quantity of CORESETs, of the plurality of CORESETs, is greater than a quantity of reference signals in the set of BFD-RSs, and wherein the set of BFD-RSs includes one or more first reference signals, of the plurality of reference signals indicated by the active transmission configuration indicator states, and does not include one or more second reference signals, of the plurality of reference signals indicated by the active transmission configuration indicator states, based at least in part on periodicities of the plurality of reference signals indicated by the active transmission configuration indicator states.

27. The method of claim 25, wherein a quantity of CORESETs, of the plurality of CORESETs, is greater than a quantity of reference signals in the set of BFD-RSs, and wherein the set of BFD-RSs includes one or more first reference signals, of the plurality of reference signals indicated by the active transmission configuration indicator states, and does not include one or more second reference signals, of the plurality of reference signals indicated by the active transmission configuration indicator states, based at least in part on identifiers of the plurality of CORESETs.

28. The method of claim 25, wherein a quantity of CORESETs, of the plurality of CORESETs, is greater than a quantity of reference signals in the set of BFD-RSs, and wherein the set of BFD-RSs includes one or more first reference signals, of the plurality of reference signals indicated by the active transmission configuration indicator states, and does not include one or more second reference signals, of the plurality of reference signals indicated by the active transmission configuration indicator states, based at least in part on a prioritization of the plurality of CORESETs.

29. The method of claim 25, wherein the capability information identifies a quantity of reference signals across all sets of BFD-RSs associated with the bandwidth part.

30. A method of wireless communication performed by an apparatus of a base station, comprising:

receiving, from a user equipment (UE), capability information associated with beam failure recovery for a plurality of transmit receive points (TRPs), wherein the capability information identifies a quantity of reference signals in each set of beam failure detection reference signals (BFD-RSs) associated with a bandwidth part;

transmitting, to the UE, a set of BFD-RSs, associated with a TRP of the plurality of TRPs, based at least in part on one of:

first periodic reference signal resources configured via a first parameter in a radio resource control (RRC) message, or a plurality of reference signals indicated by active transmission configuration indicator states for a plurality of control resource sets (CORESETs) of the TRP that are monitored by the UE; and transmitting, to the UE, a set of new beam identification reference signals (NBI-RSs), associated with the TRP, based at least in part on second periodic reference signal resources configured by a second RRC parameter, wherein sets of BFD-RSs have one-to-one associations with sets of NBI-RSs.

* * * * *